(12) United States Patent
Tayebati et al.

(10) Patent No.: US 9,366,887 B2
(45) Date of Patent: Jun. 14, 2016

(54) SYSTEMS AND METHODS FOR LASER SYSTEMS WITH VARIABLE BEAM PARAMETER PRODUCT UTILIZING THERMO-OPTIC EFFECTS

(71) Applicants: Parviz Tayebati, Sherborn, MA (US); Francisco Villarreal-Saucedo, Middleton, MA (US); Bien Chann, Merrimack, NH (US); Dat Nguyen, Wilmington, MA (US); Michael Deutsch, Wilmington, MA (US)

(72) Inventors: Parviz Tayebati, Sherborn, MA (US); Francisco Villarreal-Saucedo, Middleton, MA (US); Bien Chann, Merrimack, NH (US); Dat Nguyen, Wilmington, MA (US); Michael Deutsch, Wilmington, MA (US)

(73) Assignee: TeraDiode, Inc., Wilmington, MA (US)

( * ) Notice: Subject to any disclaimer, the term of this patent is extended or adjusted under 35 U.S.C. 154(b) by 0 days.

(21) Appl. No.: 14/852,939

(22) Filed: Sep. 14, 2015

(65) Prior Publication Data

US 2015/0378184 A1 Dec. 31, 2015

Related U.S. Application Data

(63) Continuation-in-part of application No. 14/632,283, filed on Feb. 26, 2015.

(60) Provisional application No. 62/051,681, filed on Sep. 17, 2014, provisional application No. 62/083,582, filed on Nov. 24, 2014, provisional application No. 61/944,989, filed on Feb. 26, 2014, provisional application No. 61/986,237, filed on Apr. 30, 2014.

(51) Int. Cl.
*G02F 1/01* (2006.01)
*G21K 5/02* (2006.01)
*G02B 27/14* (2006.01)
*G02B 27/09* (2006.01)

(52) U.S. Cl.
CPC .......... *G02F 1/0147* (2013.01); *G02B 27/0927* (2013.01); *G02B 27/141* (2013.01); *G21K 5/02* (2013.01)

(58) Field of Classification Search
CPC ........... G02F 1/01; G02F 1/0147; G21K 5/02; G02B 27/14; G02B 27/09
See application file for complete search history.

(56) References Cited

U.S. PATENT DOCUMENTS

| | | | |
|---|---|---|---|
| 7,630,425 | B2 | 12/2009 | Tayebati et al. |
| 2011/0305256 | A1 | 12/2011 | Chann et al. |
| 2012/0294321 | A1 | 11/2012 | Ma et al. |
| 2013/0215517 | A1 | 8/2013 | Tayebati et al. |

FOREIGN PATENT DOCUMENTS

WO 2013/086227 A1 6/2013

OTHER PUBLICATIONS

International Search Report and Written Opinion issued in a corresponding International Application No. PCT/US2015/049959 dated Dec. 30, 2015.

*Primary Examiner* — Ryan Lepisto
*Assistant Examiner* — Erin Chiem
(74) *Attorney, Agent, or Firm* — Morgan, Lewis & Bockius LLP

(57) ABSTRACT

In various embodiments, a beam-parameter adjustment system and focusing system alters a spatial power distribution of a radiation beam, via thermo-optic effects, before the beam is coupled into an optical fiber or delivered to a workpiece.

23 Claims, 28 Drawing Sheets

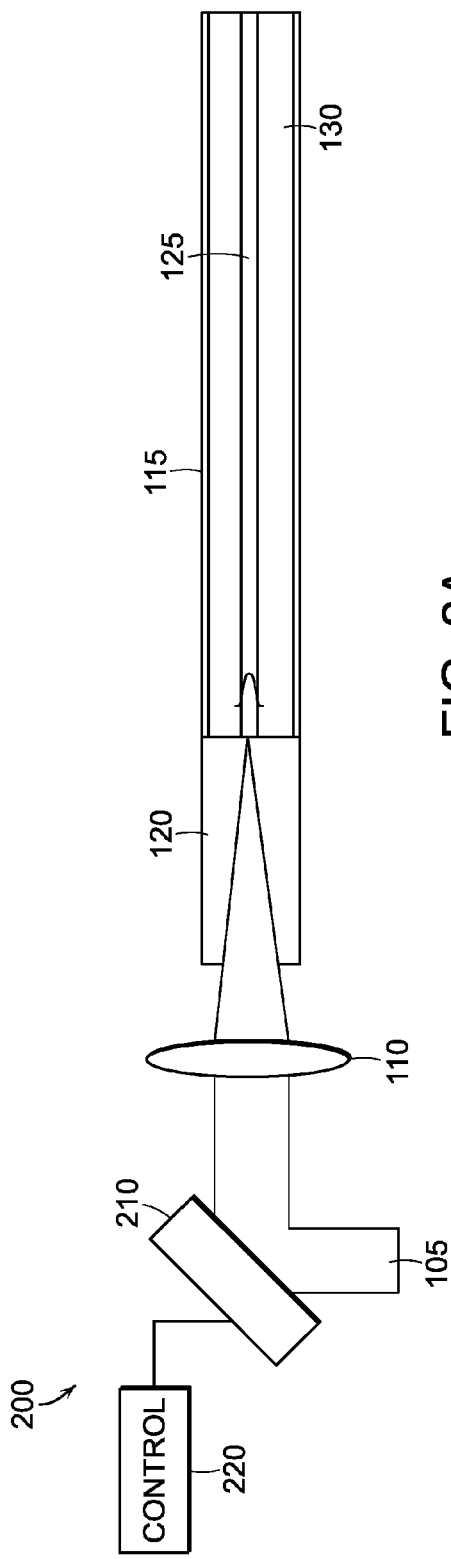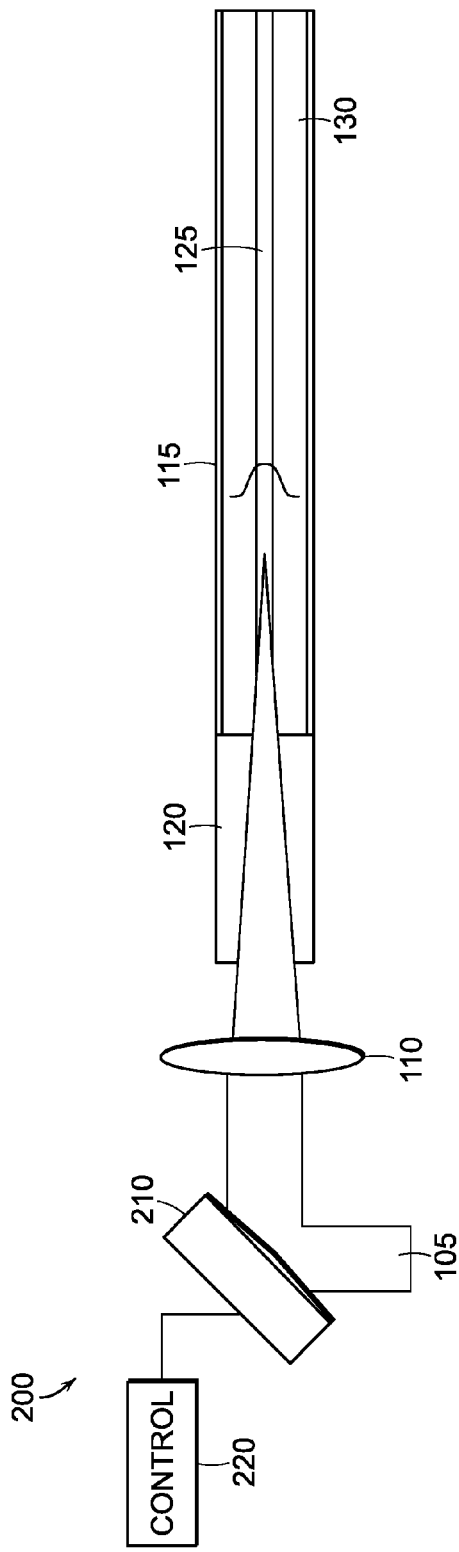

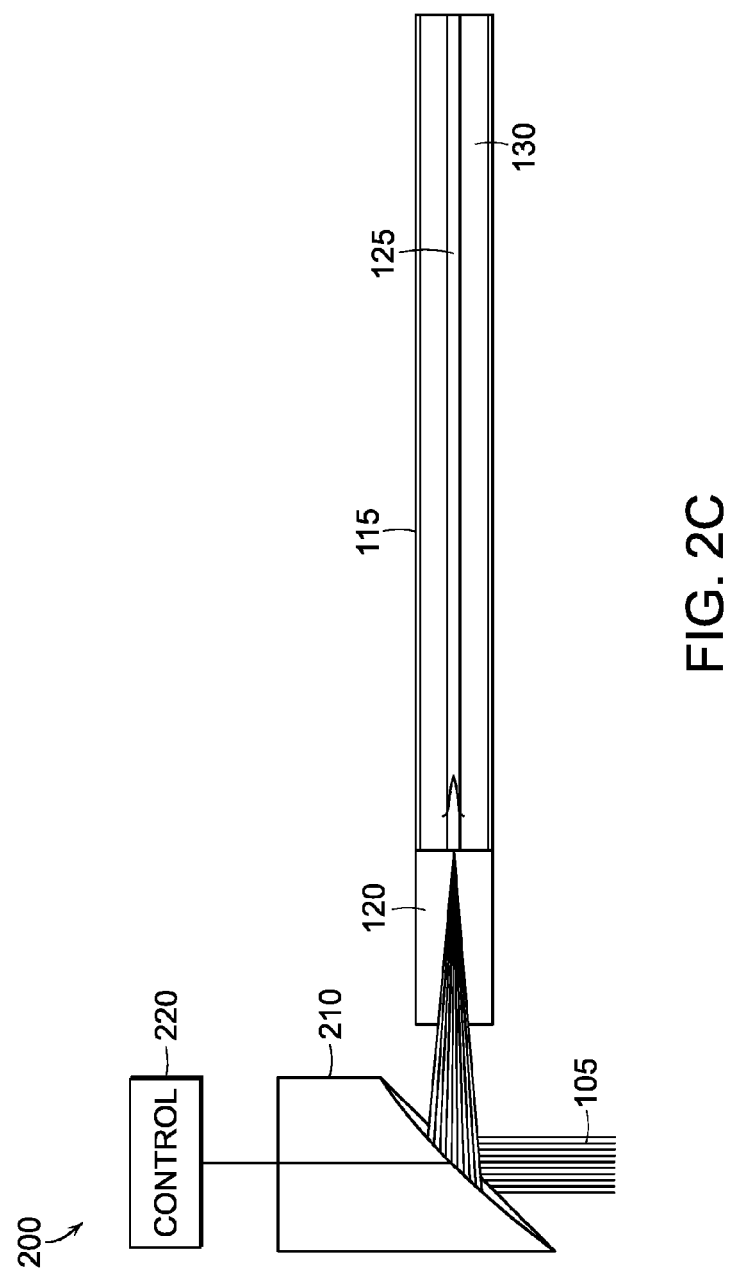

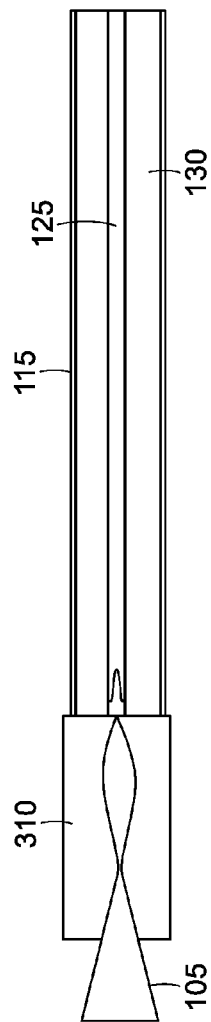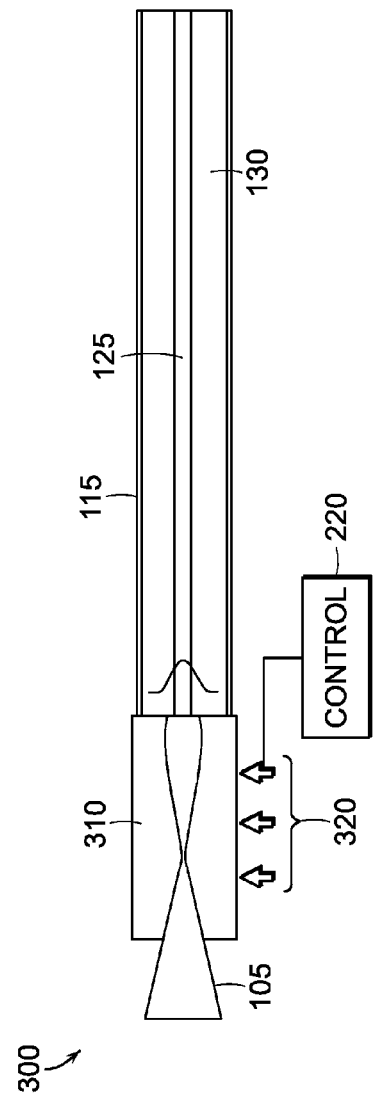

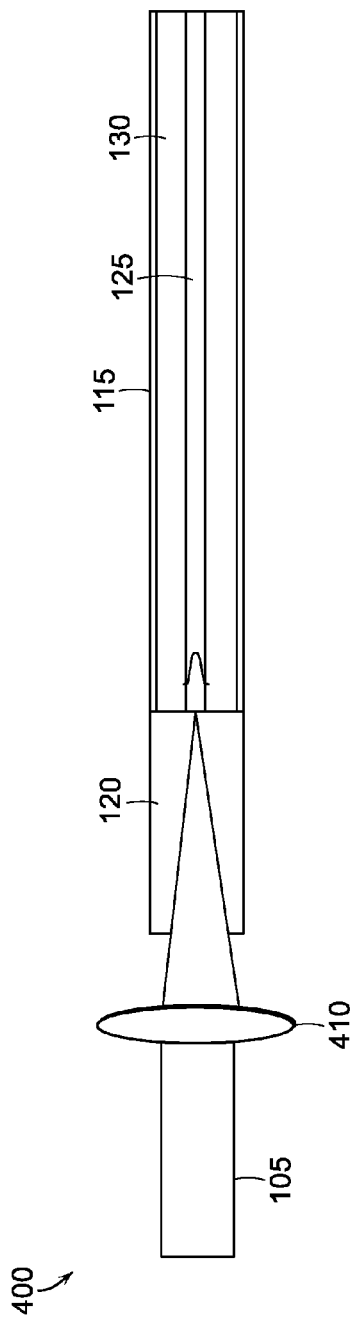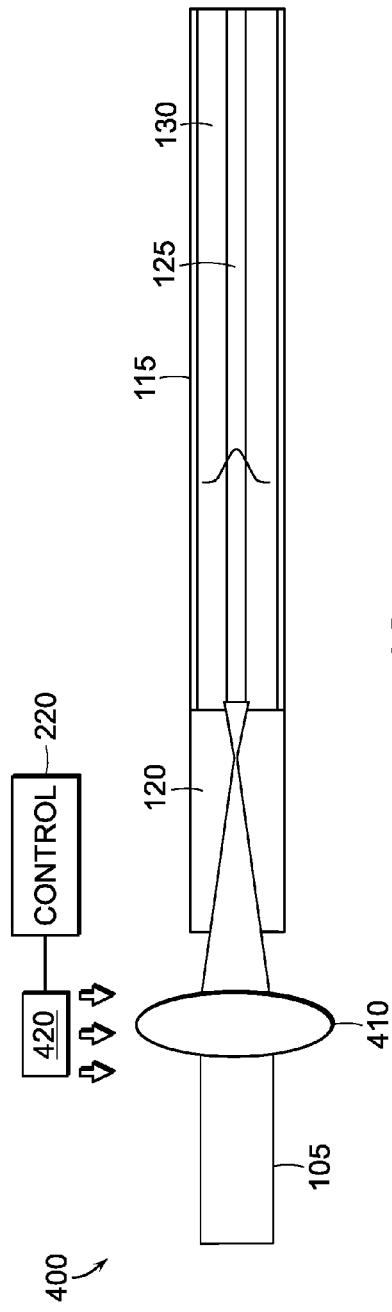

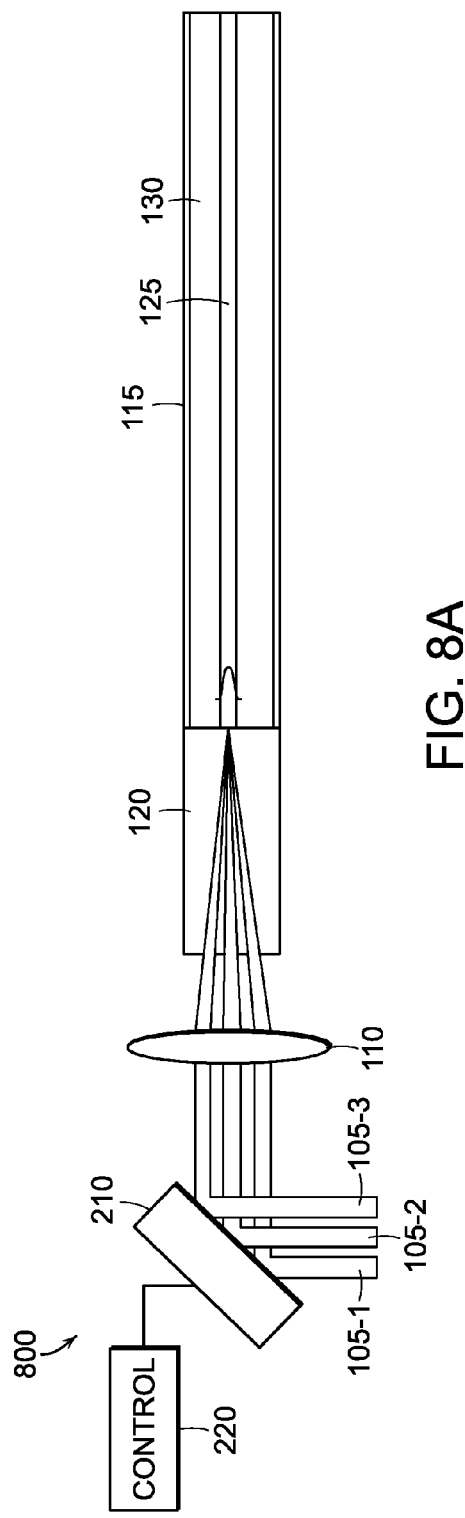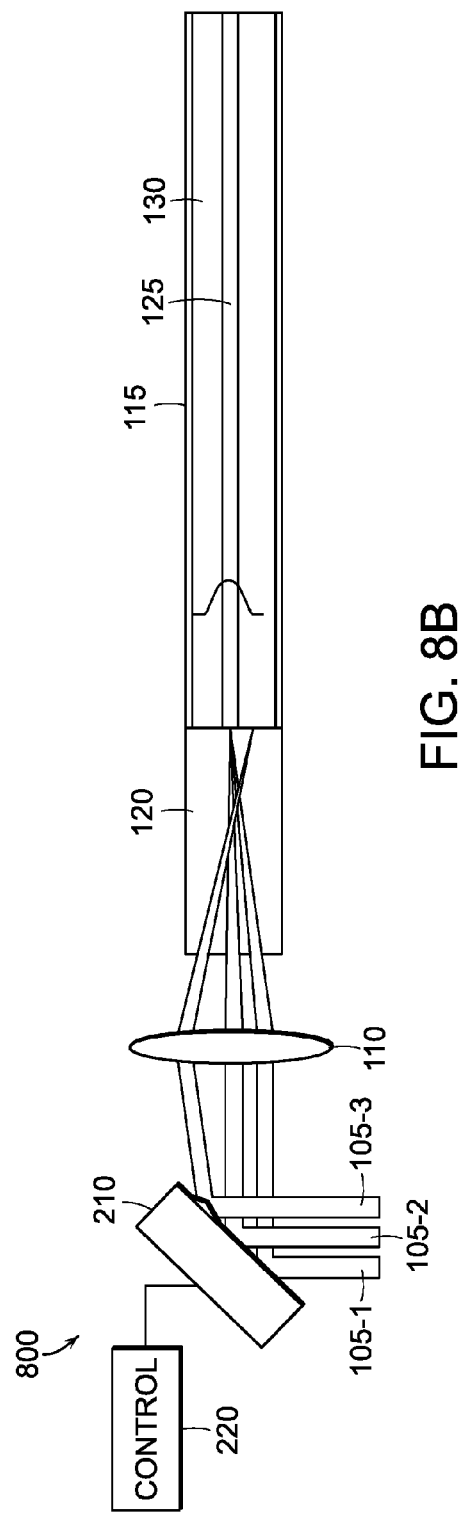

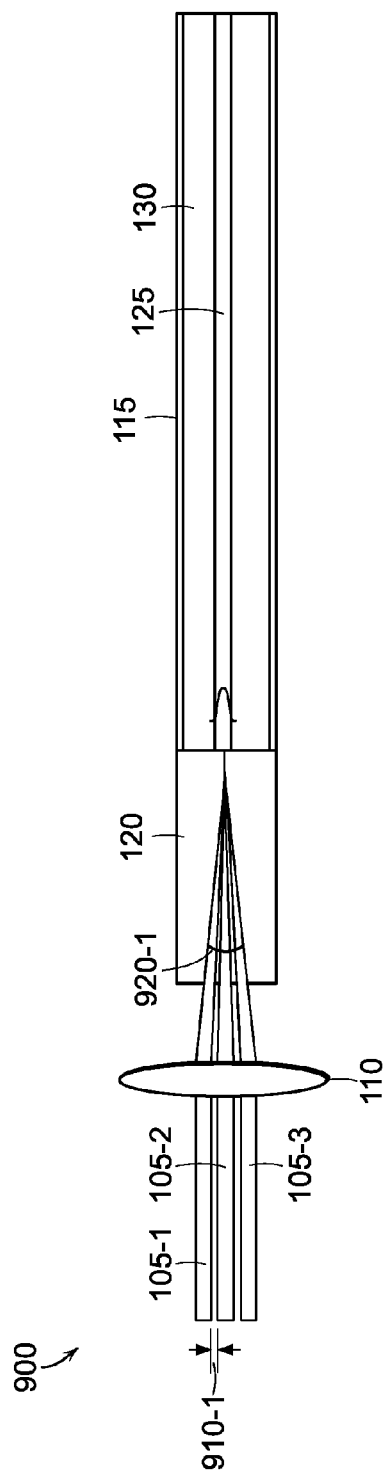
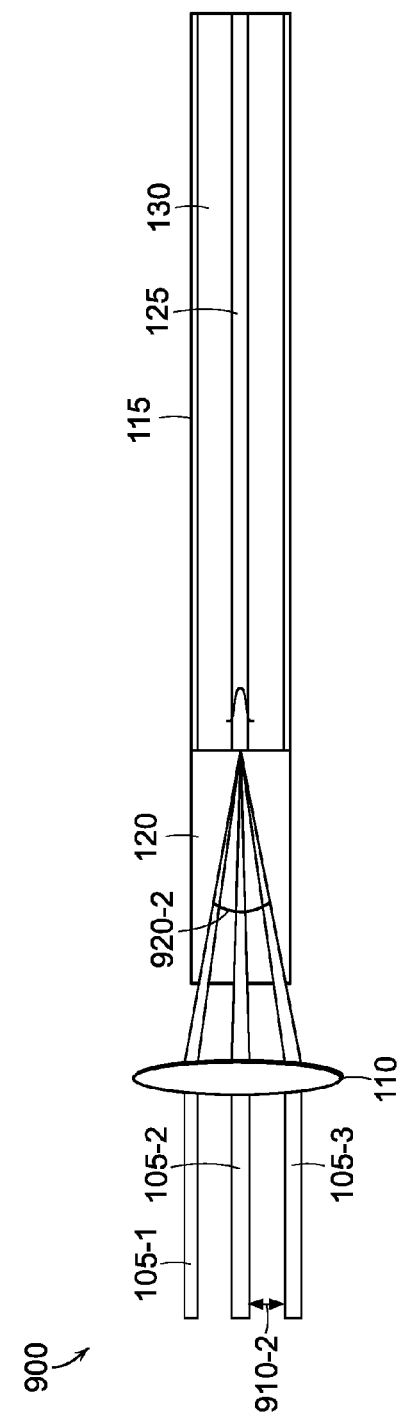

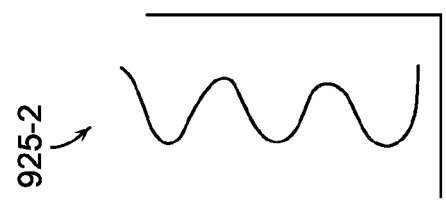
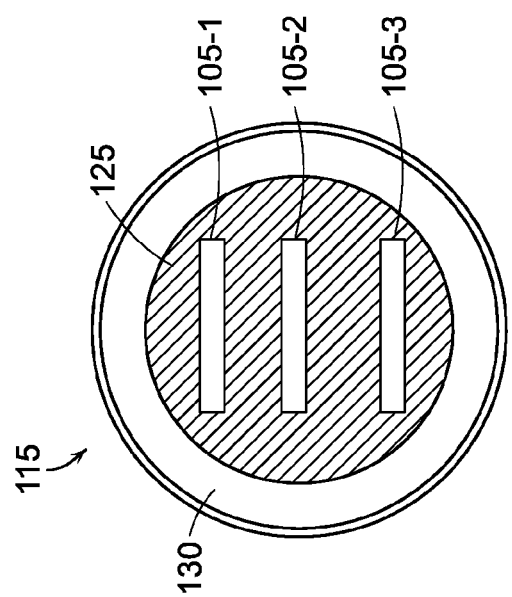
FIG. 9F
FIG. 9E

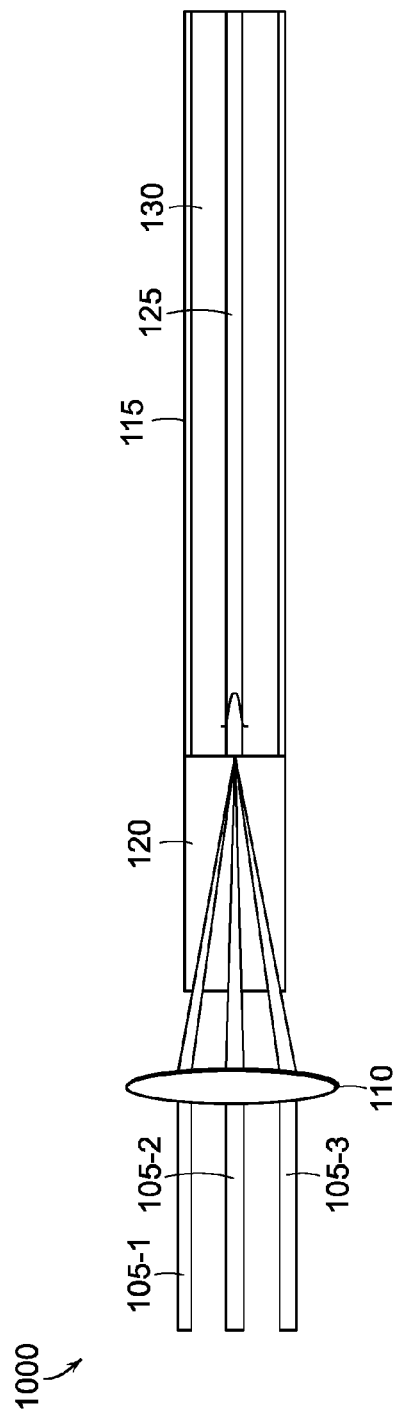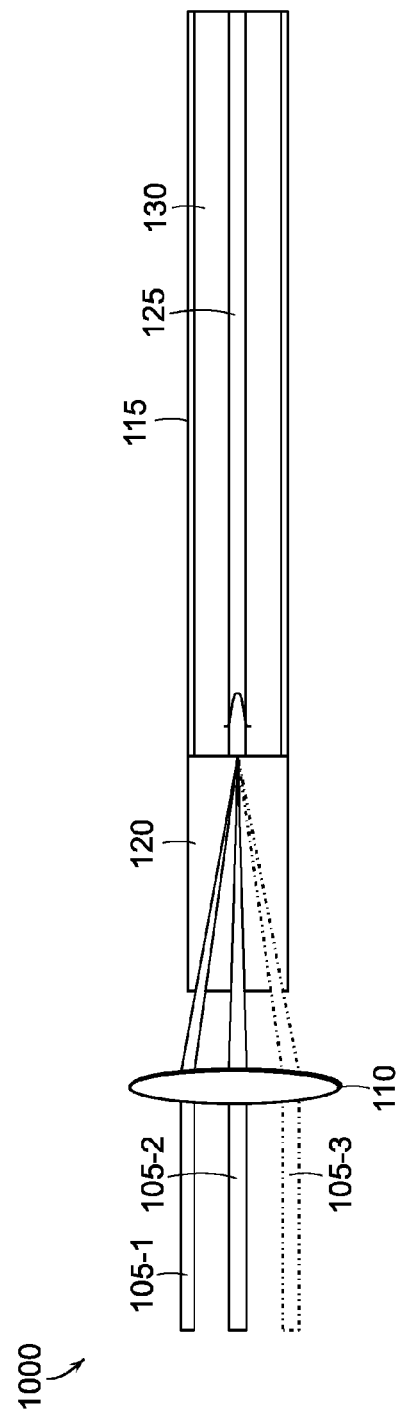

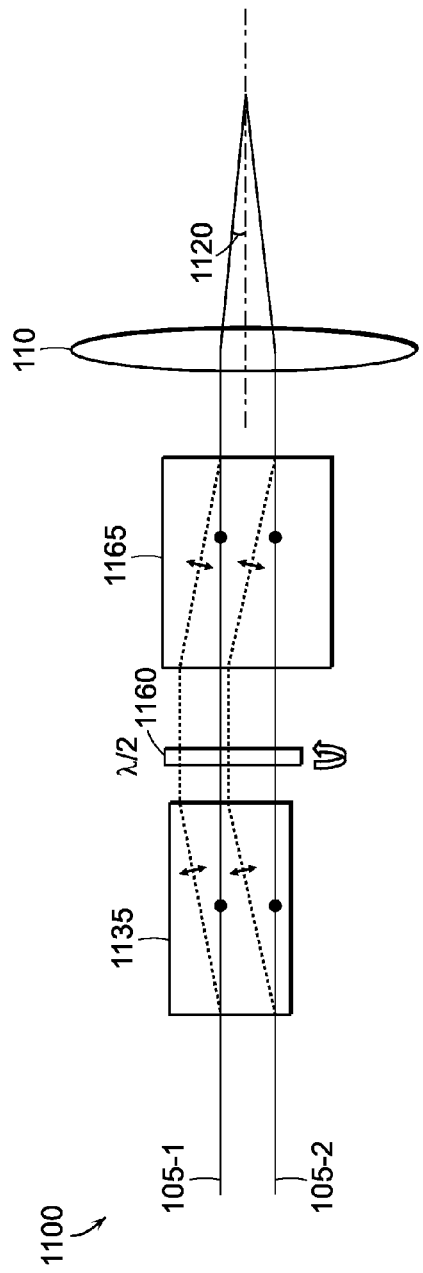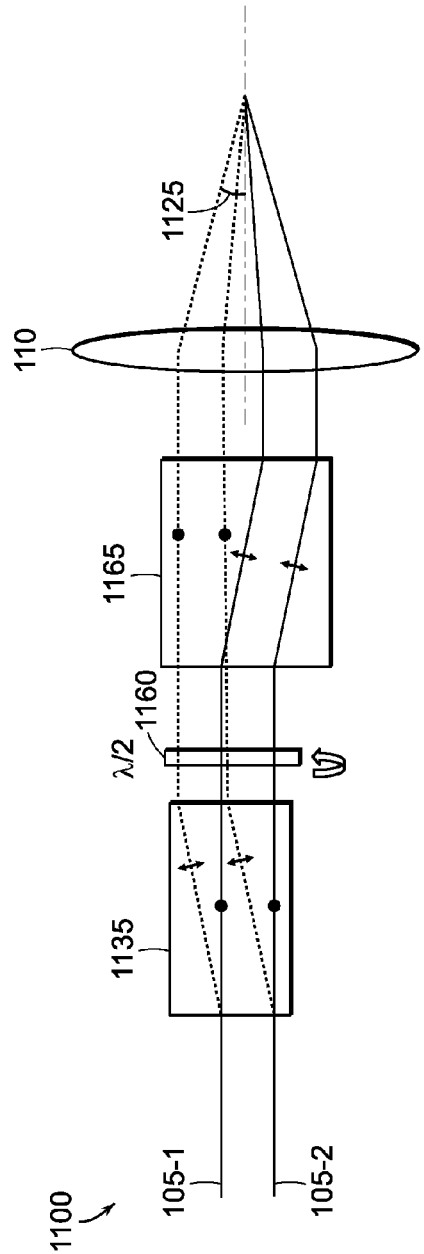

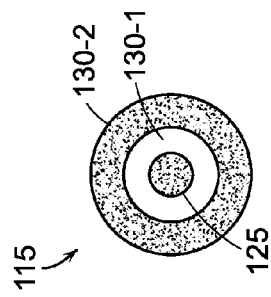
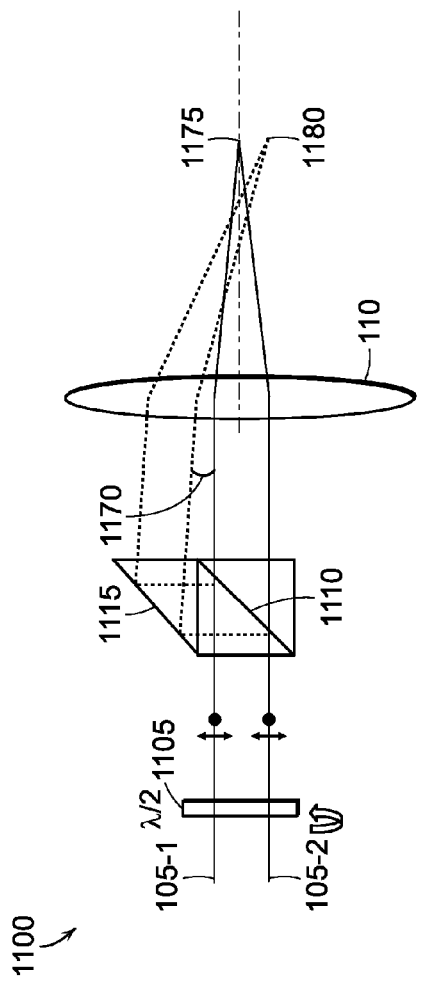
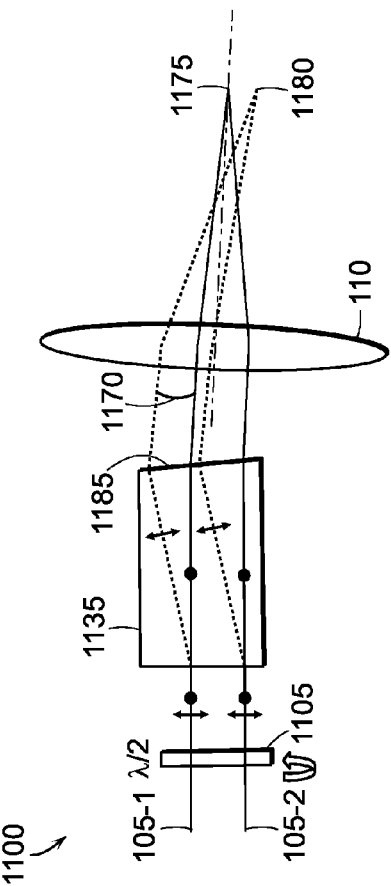

SYSTEMS AND METHODS FOR LASER SYSTEMS WITH VARIABLE BEAM PARAMETER PRODUCT UTILIZING THERMO-OPTIC EFFECTS

RELATED APPLICATIONS

This application claims the benefit of and priority to U.S. Provisional Patent Application No. 62/051,681, filed Sep. 17, 2014, and U.S. Provisional Patent Application No. 62/083,582, filed Nov. 24, 2014. This application is also a continuation-in-part of U.S. patent application Ser. No. 14/632,283, filed Feb. 26, 2015, which claims the benefit of and priority to U.S. Provisional Patent Application No. 61/944,989, filed Feb. 26, 2014, and U.S. Provisional Patent Application No. 61/986,237, filed Apr. 30, 2014. The entire disclosure of each of these applications is hereby incorporated herein by reference.

TECHNICAL FIELD

In various embodiments, the present invention relates to laser systems, specifically laser systems with controllable beam parameter products.

BACKGROUND

High-power laser systems are utilized for a host of different applications, such as welding, cutting, drilling, and materials processing. Such laser systems typically include a laser emitter, the laser light from which is coupled into an optical fiber (or simply a "fiber"), and an optical system that focuses the laser light from the fiber onto the workpiece to be processed. The optical system is typically engineered to produce the highest-quality laser beam, or, equivalently, the beam with the lowest beam parameter product (BPP). The BPP is the product of the laser beam's divergence angle (half-angle) and the radius of the beam at its narrowest point (i.e., the beam waist, the minimum spot size). The BPP quantifies the quality of the laser beam and how well it can be focused to a small spot, and is typically expressed in units of millimeter-milliradians (mm-mrad). A Gaussian beam has the lowest possible BPP, given by the wavelength of the laser light divided by pi. The ratio of the BPP of an actual beam to that of an ideal Gaussian beam at the same wavelength is denoted $M^2$, which is a wavelength-independent measure of beam quality.

In many laser-processing applications, the desired beam spot size, divergence, and beam quality may vary depending on, for example, the type of processing and/or the type of material being processed. In order to make such changes to the BPP of the laser system, frequently the output optical system or the optical fiber must be swapped out with other components and/or realigned, a time-consuming and expensive process that may even lead to inadvertent damage of the fragile optical components of the laser system. Thus, there is a need for alternative techniques for varying the BPP of a laser system that do not involve such adjustments to the laser beam or optical system at the output of the optical fiber.

SUMMARY

Various embodiments of the present invention provide laser systems in which the BPP of the system (i.e., of its output laser beam) is varied via manipulation of one or more input laser beams that are coupled into an optical fiber, rather than via manipulation of the output beam that exits the fiber. This output beam with controllably variable BPP may be utilized to process a workpiece in such applications as welding, cutting, drilling, etc. Embodiments of the invention vary the focus spot and/or the beam quality of the input laser beam(s) in order to enable a controllably variable BPP at the output of the laser system. (References herein to an input laser beam are understood to mean "one or more input laser beams," i.e., including the possibility of multiple input laser beams, unless otherwise indicated.) For example, the focus spot of an input laser beam may be varied with the input beam having a fixed beam quality, or the beam quality (e.g., beam divergence, beam size, and/or power) of an input beam may be varied, or a combination of such techniques may be utilized.

Embodiments of the invention utilize the thermo-optic effect in order to alter the BPP of the laser beam. A thermo-optic element (e.g., an optical element such as an optical flat, a nominally aberration-free lens, and/or reflective optics, the local refractive index of which changes as a function of local temperature) may be utilized to adjust the BPP of the beam. In an initial, unheated state, the thermo-optic element passes or propagates the beam without altering its BPP. When a change in beam BPP is desired, one or more portions of the thermo-optic element may be locally heated in order to form a spatially variable temperature profile T(x) within the thermo-optic element, where x is the position vector within the thermo-optic element. As known to those of skill in the art, this variable temperature profile results in, via the thermo-optic effect, a spatially variable index of refraction n within the thermo-optic element. The resulting local change in the optical path length of a beam interacting with the thermo-optic element is given by:

$$\Delta(ndx) = n \times \Delta(dx) + x \times \Delta n$$

where the first term, which is related to change in physical length or dimension, is typically small compared to the second term, which describes the change in index of refraction due to, at least in part, strain resulting from thermal expansion. The resulting changes in optical path length in the thermo-optic element due to absorption of thermal radiation and local heating will, in general, cause the BPP of the beam to degrade (i.e., increase) after interaction with (e.g., propagation through) the thermo-optic element.

The thermo-optic element may include, consist essentially of, or consist of, e.g., fused silica and/or other materials transparent to the wavelength(s) of the laser beam whose BPP is to be manipulated. Other exemplary materials for the thermo-optic element include, for example, silicon, vanadium oxide, or various polymeric materials (e.g., aromatic polyimides). The overall optical system may also include a heat source (e.g., an infrared heating source) that directs radiation onto the thermo-optic element in order to cause local changes in refractive index therein. The heat source may be integrated within the thermo-optic element, or it may be remote and configured to direct the desired pattern of radiation onto the thermo-optic element. The optical system may incorporate an imaging system and/or one or more masks (which are, e.g., substantially opaque to infrared radiation) in order to generate a desired pattern of radiation onto the thermo-optic element. An optical element (e.g., a dichroic mirror) may be utilized to direct radiation from the heat source and/or the imaging system onto the thermo-optic element.

The heat source may emit electromagnetic radiation having a wavelength, or range of wavelengths, that is substantially absorbed within the thermo-optic element, thereby resulting in the desired local-heating effect. For example, for a thermo-optic element including, consisting essentially of, or consisting of fused silica, radiation having wavelengths longer than approximately 4 µm may be utilized—such radiation is substantially absorbed (e.g., greater than 90% absorbed without transmission) in the thermo-optic element. The wavelength and bandwidth of the thermal radiation may be chosen to select the physical depth of thermal loading (and concomitant temperature change) within the thermo-optic element to create a wide range of thermal profiles. Different combinations of thermal-radiation wavelengths (or wavelength ranges) and materials for the thermo-optic element may be selected, based on the absorptive properties of the thermo-optic element, by one of skill in the art without undue experimentation.

Embodiments of the present invention couple the one or more input laser beams into an optical fiber. In various embodiments, the optical fiber has multiple cladding layers surrounding a single core, multiple discrete core regions (or "cores") within a single cladding layer, or multiple cores surrounded by multiple cladding layers.

Herein, "optical elements" may refer to any of lenses, mirrors, prisms, gratings, and the like, which redirect, reflect, bend, or in any other manner optically manipulate electromagnetic radiation. Herein, beam emitters, emitters, or laser emitters, or lasers include any electromagnetic beam-generating device such as semiconductor elements, which generate an electromagnetic beam, but may or may not be self-resonating. These also include fiber lasers, disk lasers, non-solid state lasers, etc. Generally, each emitter includes a back reflective surface, at least one optical gain medium, and a front reflective surface. The optical gain medium increases the gain of electromagnetic radiation that is not limited to any particular portion of the electromagnetic spectrum, but that may be visible, infrared, and/or ultraviolet light. An emitter may include or consist essentially of multiple beam emitters such as a diode bar configured to emit multiple beams. The input beams received in the embodiments herein may be single-wavelength or multi-wavelength beams combined using various techniques known in the art.

Embodiments of the invention may be utilized with wavelength beam combining (WBC) systems that include a plurality of emitters, such as one or more diode bars, that are combined using a dispersive element to form a multi-wavelength beam. Each emitter in the WBC system individually resonates, and is stabilized through wavelength-specific feedback from a common partially reflecting output coupler that is filtered by the dispersive element along a beam-combining dimension. Exemplary WBC systems are detailed in U.S. Pat. No. 6,192,062, filed on Feb. 4, 2000, U.S. Pat. No. 6,208,679, filed on Sep. 8, 1998, U.S. Pat. No. 8,670,180, filed on Aug. 25, 2011, and U.S. Pat. No. 8,559,107, filed on Mar. 7, 2011, the entire disclosure of each of which is incorporated by reference herein.

In an aspect, embodiments of the invention feature a beam-parameter adjustment system and focusing system for receiving and altering a spatial power distribution of a radiation beam from a beam source and focusing the radiation with the altered spatial power distribution onto a workpiece. The system includes or consists essentially of a thermo-optic element, a heat source, focusing optics, and a controller. The thermo-optic element receives the radiation beam and propagates (e.g., transmits through the thermo-optic element) the radiation beam toward the workpiece. The heat source heats portions of the thermo-optic element to alter refractive indices thereof, thereby forming an optical distortion pattern within the thermo-optic element. The thermo-optic element may be heated substantially uniformly over its cross-sectional area and/or volume, or individual portions of the thermo-optic element may be heated to different temperatures, and one or more portions of the thermo-optic element may remain substantially unheated (i.e., by a heat source external to the thermo-optic element). The focusing optics receive the radiation beam from the thermo-optic element and focus the radiation beam on or toward the workpiece. The controller controls the thermo-optic element and/or the heat source to achieve a target altered spatial power distribution on the workpiece, the target altered spatial power distribution resulting at least in part from interaction between the radiation beam and the optical distortion pattern within the thermo-optic element.

Embodiments of the invention may include one or more of the following in any of a variety of combinations. An optical element (e.g., one or more lenses and/or one or more mirrors) may direct the radiation beam onto the thermo-optic element. The thermo-optic element may include, consist essentially of, or consist of fused silica. The workpiece may include, consist essentially of, or consist of an end face of an optical fiber or a metallic object (e.g., a metallic plate or other object to be, for example, welded, cut, soldered, or otherwise processed by the radiation beam). The focusing optics may include, consist essentially of, or consist of one or more lenses (e.g., one or more spherical lenses and/or one or more cylindrical lenses). The heat source may include or consist essentially of a plurality of individually controllable heating elements each configured to heat a different portion of the thermo-optic element. The heating elements may be disposed on or proximate the thermo-optic element, or they may be positioned at a distance and their heat directed toward the thermo-optic element. A masking element may be disposed optically downstream of the heat source and optically upstream of the thermo-optic element. The masking element may include, consist essentially of, or consist of (i) one or more areas substantially transparent to radiation from the heat source and (ii) one or more areas substantially opaque to radiation from the heat source. One or more mirrors (e.g., one or more dichroic mirrors) may direct radiation from the heat source to the thermo-optic element. The radiation beam may include, consist essentially of, or consist of a multi-wavelength beam.

In another aspect, embodiments of the invention feature a method of manipulating a radiation beam from a beam source. Heat is applied to one or more portions of a thermo-optic element, thereby forming an optical distortion pattern within the thermo-optic element. The radiation beam is received by the thermo-optic element, a spatial power distribution of the radiation beam being altered in response to the optical distortion pattern within the thermo-optic element. The radiation beam with the altered spatial power distribution is focused on or toward a workpiece.

Embodiments of the invention may include one or more of the following in any of a variety of combinations. The radiation beam may include, consist essentially of, or consist of a multi-wavelength beam. Applying heat to one or more portions of the thermo-optic element may include, consist essentially of, or consist of heating each portion of the thermo-optic element with an individually controllable heating element. Applying heat to one or more portions of the thermo-optic element may include, consist essentially of, or consist of (i) generating radiation at a heat source and directing the radiation toward the thermo-optic element, (ii) blocking one or more first portions of the radiation, thereby preventing the one or more first portions from heating the thermo-optic element, and (iii) allowing one or more second portions of the radiation to propagate to the thermo-optic element. Applying heat to one or more portions of the thermo-optic element may include, consist essentially of, or consist of (i) generating radiation in a spatially varying heating pattern, and (ii) directing the radiation toward the thermo-optic element, the heating pattern generating the optical distortion pattern in the thermo-optic element.

In yet another aspect, embodiments of the invention feature a laser system that includes, consists essentially of, or consists of an array of beam emitters, focusing optics, a dispersive element, a partially reflective output coupler, a thermo-optic element, a heat source, and second focusing optics. Each beam emitter emits a beam. The focusing optics focus the beams toward the dispersive element. The dispersive element receives and disperses the focused beams, thereby forming a multi-wavelength beam. The partially reflective output coupler receives the multi-wavelength beam, reflects a first portion thereof back toward the dispersive element, and transmits a second portion thereof as an output beam composed of multiple wavelengths. The thermo-optic element receives the output beam and propagates the output beam toward a workpiece. The heat source heats portions of the thermo-optic element to alter refractive indices thereof, thereby forming an optical distortion pattern within the thermo-optic element. The second focusing optics receive the output beam from the thermo-optic element and focus the output beam on or toward the workpiece.

Embodiments of the invention may include one or more of the following in any of a variety of combinations. The laser system may include a controller for controlling the thermo-optic element and/or the heat source to achieve a target altered spatial power distribution on the workpiece, the target altered spatial power distribution resulting at least in part from interaction between the output beam and the optical distortion pattern within the thermo-optic element. The thermo-optic element may include, consist essentially of, or consist of fused silica. The workpiece may include, consist essentially of, or consist of an end face of an optical fiber or a metallic object. The heat source may include or consist essentially of a plurality of individually controllable heating elements each configured to heat a different portion of the thermo-optic element. The heating elements may be disposed on or proximate the thermo-optic element, or they may be positioned at a distance and their heat directed toward the thermo-optic element. A masking element may be disposed optically downstream of the heat source and optically upstream of the thermo-optic element. The masking element may include, consist essentially of, or consist of (i) one or more areas substantially transparent to radiation from the heat source and (ii) one or more areas substantially opaque to radiation from the heat source. One or more mirrors (e.g., one or more dichroic mirrors) may direct radiation from the heat source to the thermo-optic element. The dispersive element may include or consist essentially of a diffraction grating (e.g., a transmissive diffraction grating or a reflective diffraction grating).

These and other objects, along with advantages and features of the present invention herein disclosed, will become more apparent through reference to the following description, the accompanying drawings, and the claims. Furthermore, it is to be understood that the features of the various embodiments described herein are not mutually exclusive and may exist in various combinations and permutations. As used herein, the term "substantially" means±10%, and in some embodiments, ±5%. The term "consists essentially of" means excluding other materials that contribute to function, unless otherwise defined herein. Nonetheless, such other materials may be present, collectively or individually, in trace amounts. Herein, the terms "radiation" and "light" are utilized interchangeably unless otherwise indicated. Herein, "downstream" or "optically downstream," is utilized to indicate the relative placement of a second element that a light beam strikes after encountering a first element, the first element being "upstream," or "optically upstream" of the second element. Herein, "optical distance" between two components is the distance between two components that is actually traveled by light beams; the optical distance may be, but is not necessarily, equal to the physical distance between two components due to, e.g., reflections from mirrors or other changes in propagation direction experienced by the light traveling from one of the components to the other.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which:

FIGS. 2A-2C are schematic diagrams of laser systems incorporating deformable mirrors in accordance with various embodiments of the invention;

FIGS. 3A and 3B are schematic diagrams of laser systems incorporating graded-index lenses in accordance with various embodiments of the invention;

FIGS. 4A and 4B are schematic diagrams of laser systems incorporating adjustable lenses in accordance with various embodiments of the invention;

FIGS. 8A and 8B are schematic diagrams of laser systems incorporating deformable mirrors and multiple input beams in accordance with various embodiments of the invention;

FIGS. 9A and 9B are schematic diagrams of laser systems incorporating multiple input beams with adjustable spacings in accordance with various embodiments of the invention;

FIG. 9E is a schematic diagram of the input beams at the focusing lens of the laser system of FIG. 9B;

FIG. 9F is a schematic profile of the output beam of the laser system of FIG. 9B;

FIGS. 10A and 10B are schematic diagrams of laser systems incorporating multiple variable-power input beams in accordance with various embodiments of the invention;

FIGS. 11E-11H are schematic diagrams of laser systems in which input beam quality is adjusted on the basis of polarization in accordance with various embodiments of the invention;

FIGS. 11I and 11J are schematic diagrams of laser systems in which input beam quality is adjusted on the basis of polarization and that are utilized with multi-cladding optical fibers in accordance with various embodiments of the invention;

FIG. 11K is a schematic plot of spatial power distribution within a multi-cladding optical fiber utilized with the laser systems of FIG. 11I or FIG. 11J;

DETAILED DESCRIPTION

Figure 1:
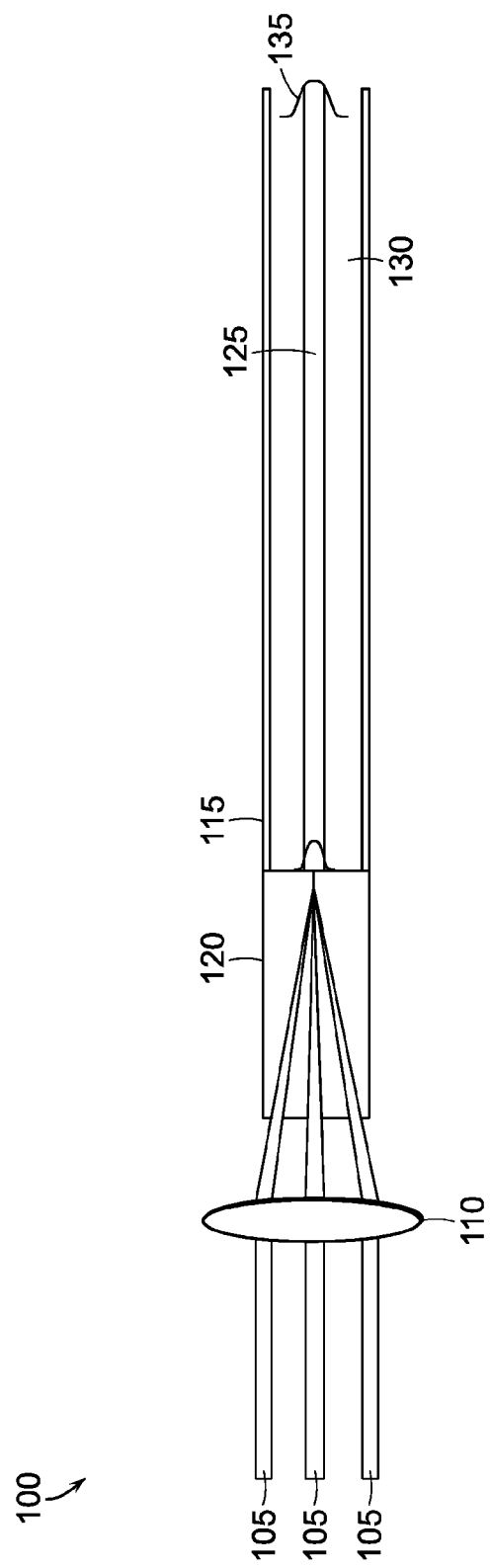
FIG. 1 is a schematic diagram of a laser system in accordance with various embodiments of the invention.

FIG. 1 is a schematic diagram of a laser system 100 in accordance with various embodiments of the present invention. In the laser system 100, one or more input beams 105 are focused via a focusing lens 110 into an optical fiber 115 having a fiber end cap 120. The end cap 120 may be, for example, a piece of "coreless" (i.e., substantially homogeneous) or graded-index (i.e., having a graded index of refraction) glass, and the end cap 120 may advantageously reduce the optical intensity at the glass-air interface for a given optical power and/or protect the fiber 115 from environmental damage (e.g., moisture). As shown, the optical fiber 115 may have one or more cores 125 surrounded by one or more cladding layers 130. For laser system 100, the BPP of the input beam or beams 105 is defined as $(x/2) \times \theta = (x \times d)/(4 \times f)$, where x is the diameter (or "beam size") of the input beam 105, $\theta$ is the laser beam divergence (or "beam divergence") of the input beam 105, d is the focused diameter of the focused input beam 105, and f is the focal length of the focusing lens 110. The beam size is typically calculated in terms of the "second moment width" or "D4σ width," where the D4σ width of a beam in the horizontal or vertical direction is 4 times σ, where σ is the standard deviation of the horizontal or vertical marginal distribution, respectively. An optical fiber 115 having a single core 125 and a single cladding layer 130 may be assumed to have a core diameter of d' and a cladding diameter of D'.

Once the one or more input beams 105 are coupled into the optical fiber 115, the fiber 115 outputs an output beam 135. The BPP of the output beam 135 (or "output BPP") may be defined as $(d''/2) \times NA''$, where NA'' is the numerical aperture of the fiber 115 and d'' is the output beam size. The output beam size d'' depends on the relative amounts of the beam propagating within the cladding 130 and within the core 125 (or, equivalently, the "power content ratio" of the cladding 130 to the core 125). For example, the output BPP may be minimized by minimizing the amount of the beam within the cladding 130, and the output BPP may be maximized by minimizing the amount of the beam within the core 125. Thus, the output BPP may be adjusted to a desired value by focusing different amounts of the input beam(s) within the different regions of the fiber 115. In general, the fiber 115 maintains the entry angle (or divergence or numerical aperture) of input light within the output beam; thus, the output BPP may be advantageously varied via variation of the input beam quality (or BPP).

Referring to FIGS. 2A and 2B, in an exemplary laser system 200 in accordance with various embodiments of the present invention, a deformable mirror 210 is utilized to alter the point at which one or more input beams 105 are focused into the optical fiber 115. As shown in FIG. 2A, in a nominal condition, the input beam(s) 105 are focused by the deformable mirror 210 and the focusing lens 110 into the core 125 of the fiber 115, thus minimizing the output BPP. As shown in FIG. 2B, the deformable mirror 210 may be manipulated (e.g., by altering the angle of one or more points on its surface) such that the input beam 105 is focused such that a fraction of the light spills over into the cladding 130, increasing the output BPP. Similarly, the deformable mirror 210 may be utilized to focus all or part of the focused input beam 105 into a core other than core 125 when the fiber 115 is a multi-core optical fiber. As known in the art, the deformable mirror 210 may include or consist essentially of, for example, a segmented mirror formed by independent flat mirror segments. Each segment may move a small distance back and forth and/or tilt in one or more directions, in response to an actuator, to alter the wavefront of incoming light. Other exemplary deformable mirrors 210 include continuous-face-plate mirrors including or consisting essentially of a continuous membrane deformable by any of an array of actuators located at the back surface of the membrane.

As shown in FIGS. 2A and 2B, the deformable mirror 210 and/or the array of actuators deforming portions thereof are responsive to a controller 220, which thereby alters a conformation of the reflective surface of the deformable mirror 210. The controller 220 is responsive to a desired target radiation power distribution (e.g., input by a user) and configured to produce a mirror conformation causing the input beams to strike the end face of fiber 115 with the target radiation power distribution. The controller 220 may be programmed to achieve the desired power distribution (and thus the desired output BPP) via a particular mirror surface conformation without undue experimentation by one of skill in the art. The controller 220 may be provided as either software, hardware, or some combination thereof. For example, the system may be implemented on one or more conventional server-class computers, such as a PC having a CPU board containing one or more processors such as the Pentium or Celeron family of processors manufactured by Intel Corporation of Santa Clara, Calif., the 680x0 and POWER PC family of processors manufactured by Motorola Corporation of Schaumburg, Ill., and/or the ATHLON line of processors manufactured by Advanced Micro Devices, Inc., of Sunnyvale, Calif. The processor may also include a main memory unit for storing programs and/or data relating to the methods described above. The memory may include random access memory (RAM), read only memory (ROM), and/or FLASH memory residing on commonly available hardware such as one or more application specific integrated circuits (ASIC), field programmable gate arrays (FPGA), electrically erasable programmable read-only memories (EEPROM), programmable read-only memories (PROM), programmable logic devices (PLD), or read-only memory devices (ROM). In some embodiments, the programs may be provided using external RAM and/or ROM such as optical disks, magnetic disks, as well as other commonly used storage devices. For embodiments in which the functions are provided as one or more software programs, the programs may be written in any of a number of high level languages such as FORTRAN, PASCAL, JAVA, C, C++, C#, BASIC, various scripting languages, and/or HTML. Additionally, the software may be implemented in an assembly language directed to the microprocessor resident on a target computer; for example, the software may be implemented in Intel 80x86 assembly language if it is configured to run on an IBM PC or PC clone. The software may be embodied on an article of manufacture including, but not limited to, a floppy disk, a jump drive, a hard disk, an optical disk, a magnetic tape, a PROM, an EPROM, EEPROM, field-programmable gate array, or CD-ROM.

As shown in FIG. 2C, the deformable mirror 210 may be parabolic (i.e., have a reflecting surface all or a portion of which is substantially parabolic), and such deformable mirrors themselves may focus (even without a separate focusing lens 110) one or more input beams 105 (all or portions of each of which may be manipulated via alterations of the surface of the deformable mirror 210) to a variety of regions of fiber 115, depending upon the desired output BPP of the laser system 200.

Referring to FIGS. 3A and 3B, in an exemplary laser system 300 in accordance with various embodiments of the present invention, a graded-index (or "GRIN") lens 310 is utilized to alter the point at which one or more input beams 105 are focused into the optical fiber 115 and/or the spot size of the focused beam(s). As shown in FIG. 3A, in a nominal condition, the input beam(s) 105 are focused by the GRIN lens 310 into the core 125 of the fiber 115, thus minimizing the output BPP. In the nominal condition of FIG. 3A, as shown, the input beam(s) 105 propagate within the GRIN lens 310 such that the spot size of the input beam(s) 105 at the interface between the GRIN lens 310 and the fiber 115 is minimized and directed into the core 125. As shown in FIG. 3B, the GRIN lens 310 may be manipulated (or "disturbed" or "perturbed," indicated by arrows 320) such that the spot size of the input beam(s) 105 at the interface between the GRIN lens 310 and the fiber 115 is altered (e.g., larger). As shown, in the condition depicted in FIG. 3B, a fraction of the incoming light is coupled into the cladding 130 (or into another core and/or cladding in multiple-core and/or multiple-cladding fibers), thereby increasing the output BPP. In various embodiments, when the GRIN lens 310 is disturbed, one or more optical properties (e.g., refractive index) change in at least a portion of the GRIN lens 310. For example, the GRIN lens 310 may be disturbed via local heating of a portion of the lens and/or local absorption of radiation in a portion of the lens. In some embodiments, all or a portion of the GRIN lens 310 includes or consists of a material exhibiting the acousto-optic effect, and an acoustic transducer may be utilized to alter the optical properties of the GRIN lens 310. For example, the GRIN lens 310 may include or consist essentially of fused silica, lithium niobate, arsenic trisulfide, tellurium dioxide, tellurite glass, lead silicate, and/or another acousto-optical material. Similarly, an electric field may be applied to a GRIN lens 310 exhibiting the electro-optic effect to alter its refractive index, thereby disturbing the lens sufficiently to alter the output BPP.

As shown in FIG. 3B, the means for introducing a distortion in the GRIN lens 310 (e.g., at least one of a local heater, a radiation source directed into the lens, an acousto-optic modulator and/or transducer altering an optical property of the lens, or an electro-optic modulator and/or transducer altering an optical property of the lens) is responsive to a controller 220. Controller 220 may be conventional, and may be configured to introduce and/or control the distortion-inducing means in response to a desired output BPP without undue experimentation.

Referring to FIGS. 4A and 4B, in an exemplary laser system 400 in accordance with various embodiments of the present invention, an adjustable focusing lens 410 is utilized to alter the point at which one or more input beams 105 are focused into the optical fiber 115 and/or the spot size of the focused beam(s) via, e.g., manipulation of the lens 410 to alter its focal point. As shown in FIG. 4A, in a nominal condition, the input beam(s) 105 are focused by the adjustable lens 410 into the core 125 of the fiber 115, thus minimizing the output BPP. In the nominal condition of FIG. 4A, as shown, the input beam(s) 105 are focused such that the focal point is disposed at the interface between the end cap 120 and the fiber 115; thus, the spot size of the input beam(s) is minimized and directed into the core 125. As shown in FIG. 4B, the adjustable lens 410 may be manipulated (or "disturbed" or "perturbed") such that the focal length of the lens 410 changes. For example, as shown in FIG. 4B, the focal length may be decreased such that the input beams are focused at a point within the bulk of the end cap 120, thereby increasing the spot size at the interface between the end cap 120 and the fiber 115. Thus, in the condition depicted in FIG. 4B, a fraction of the incoming light is coupled into the cladding 130 (or into another core and/or cladding in multiple-core and/or multiple-cladding fibers), thereby increasing the output BPP. The adjustable lens 410 may be perturbed by, e.g., application of heat to the lens 410 from a heating source 420. As shown, the heating source 420 is responsive to a controller 220. Controller 220 may be conventional, and may be configured to introduce heat and/or control the heating level provided by the heating source 420 in response to a desired output BPP without undue experimentation.

Figure 5A:
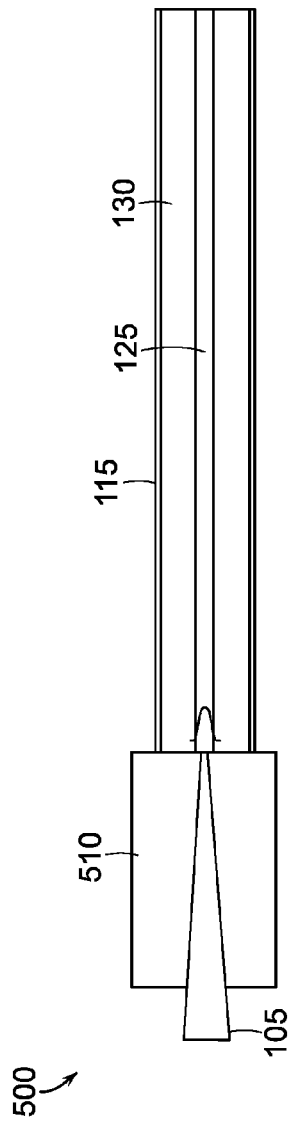
FIGS. 5A and 5B are schematic diagrams of laser systems incorporating adjustable end caps in accordance with various embodiments of the invention.
Figure 5B:
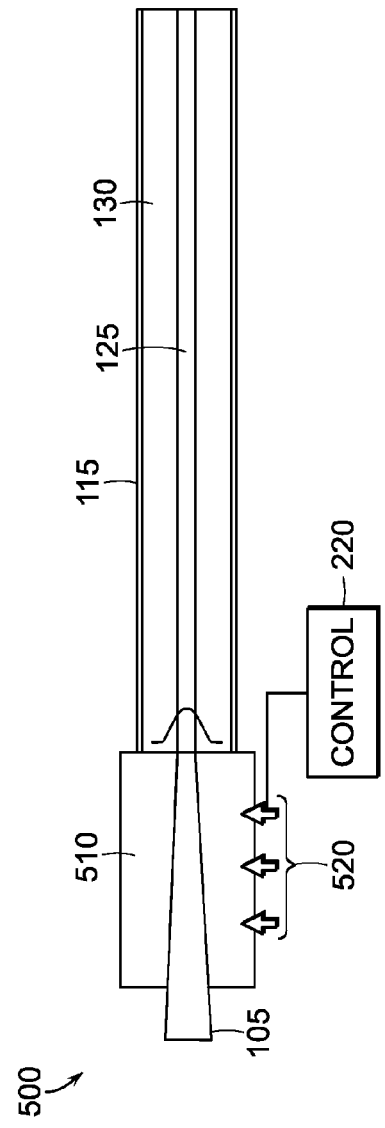

Referring to FIGS. 5A and 5B, in an exemplary laser system 500 in accordance with various embodiments of the present invention, an adjustable end cap 510 is utilized to alter the point at which one or more input beams 105 are focused into the optical fiber 115 and/or the spot size of the focused beam(s) via, e.g., manipulation of the end cap 510 to alter its optical properties (e.g., refractive index). As shown in FIG. 5A, in a nominal condition, the input beam(s) 105 are focused by a lens (not shown) into the end cap 510 and into the core 125 of the fiber 115, thus minimizing the output BPP. In the nominal condition of FIG. 5A, as shown, the input beam(s) 105 are focused such that the focal point is disposed at the interface between the end cap 120 and the fiber 115; thus, the spot size of the input beam(s) is minimized and directed into the core 125. As shown in FIG. 5B, the adjustable end cap 510 may be manipulated (or "disturbed" or "perturbed") such that the focal point of the input beam(s) changes. For example, as shown in FIG. 5B, the focal point may be moved to a point within the optical fiber 115, thereby increasing the spot size at the interface between the end cap 510 and the fiber 115. Thus, in the condition depicted in FIG. 5B, a fraction of the incoming light is coupled into the cladding 130 (or into another core and/or cladding in multiple-core and/or multiple-cladding fibers), thereby increasing the output BPP. The adjustable end cap 510 may be perturbed by, e.g., application of heat and/or pressure to the end cap 510.

As shown in FIG. 5B, the means 520 for introducing a distortion in the fiber end cap 510 (e.g., at least one of a local heater, a radiation source directed into the end cap, an acousto-optic modulator and/or transducer altering an optical property of the end cap, or an electro-optic modulator and/or transducer altering an optical property of the end cap) is responsive to a controller 220. Controller 220 may be conventional, and may be configured to introduce and/or control the distortion-inducing means in response to a desired output BPP without undue experimentation.

Figure 6A:
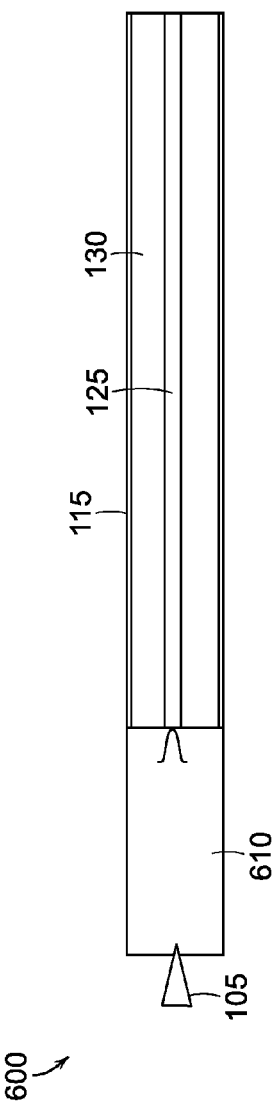
FIGS. 6A and 6B are schematic diagrams of laser systems incorporating graded-index in-coupling fibers in accordance with various embodiments of the invention.
Figure 6B:
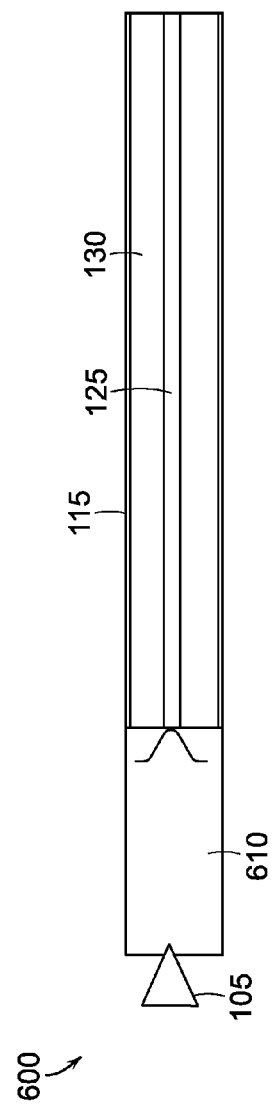

Referring to FIGS. 6A and 6B, in an exemplary laser system 600 in accordance with various embodiments of the present invention, a graded-index (or "gradient-index" or "gradient") optical fiber is utilized to alter the spot size of the input beam(s) 105 at the inlet of the optical fiber 115. As known in the art, a gradient-index fiber is an optical fiber whose core has a refractive index that decreases with increasing radial distance from the optical axis of the fiber. Because parts of the core closer to the fiber axis have a higher refractive index than the parts near the cladding, light rays follow sinusoidal paths down the gradient-index fiber. The refractive index profile within the graded-index fiber 610 may be, for example, substantially parabolic. Thus, the spot size of the beam propagated through the gradient-index fiber 610 may be controlled via control of the numerical aperture of the input beam coupled into the gradient-index fiber 610, for example using one of the numerical-aperture-altering techniques described herein. As shown in FIG. 6A, one or more input beams 105 having a small numerical aperture (i.e., a small divergence) will propagate through the gradient fiber 610 and produce a small spot size focused such that substantially all of the beam is coupled into the core 125 of the fiber 115. As shown in FIG. 6B, one or more input beams 105 having a larger numerical aperture (i.e., a larger divergence) will propagate through the gradient fiber 610 and produce a larger spot size focused such that a portion of the beam is coupled into the cladding 130 of the fiber 115, thereby altering (here increasing) the output BPP. The gradient fiber 610 may have a length of, for example, less than approximately 100 mm.

Figure 7A:
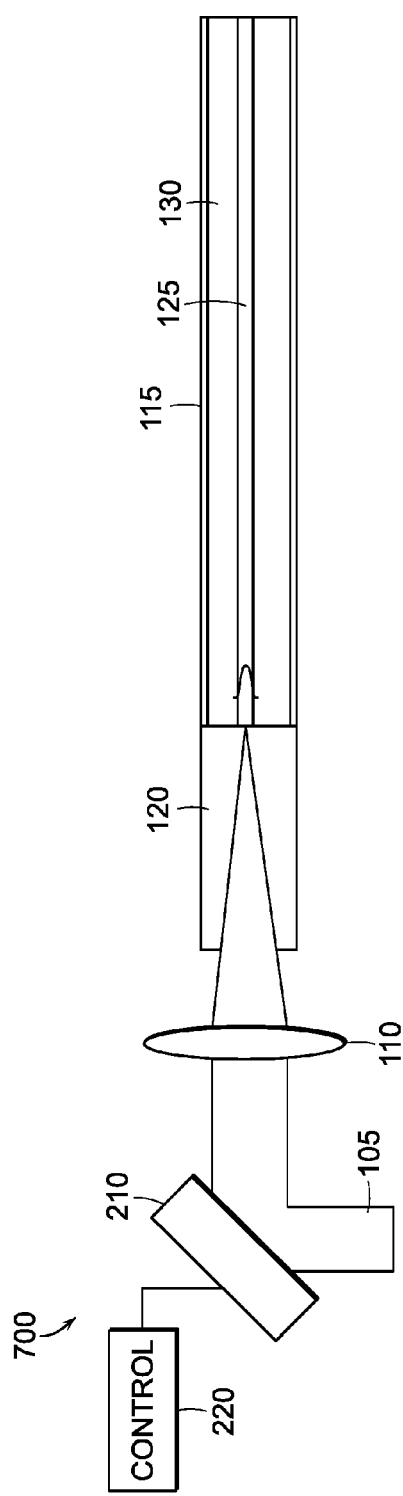
FIGS. 7A and 7B are schematic diagrams of laser systems incorporating deformable mirrors in accordance with various embodiments of the invention.
Figure 7B:
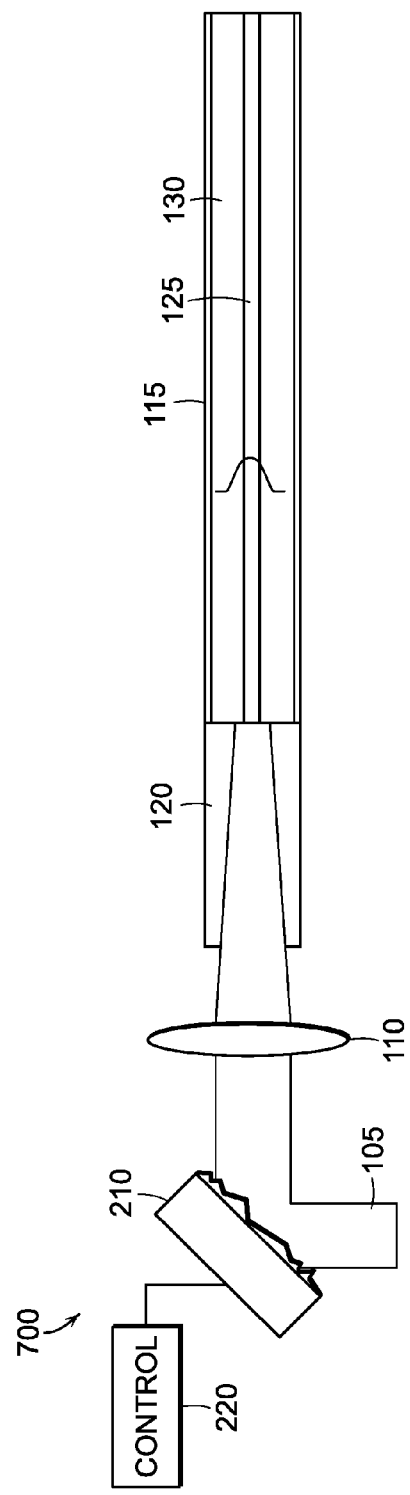

In accordance with various embodiments of the present invention, the output BPP of a laser system may be variably controlled via control of the input wavefront distribution (i.e., the input beam quality) such that at least a portion of the light coupled into an optical fiber is induced to propagate within one or more cladding layers, rather than the core of the fiber (and/or within another core of the fiber, for fibers having multiple cores). For example, FIGS. 7A and 7B depict an exemplary laser system 700 in accordance with various embodiments of the present invention, in which a deformable mirror 210 is utilized to alter the point at which one or more input beams 105 is focused into the optical fiber 115. As shown in FIG. 7A, in a nominal condition, the input beam(s) 105 are focused by the deformable mirror 210 and the focusing lens 110 into the core 125 of the fiber 115, thus minimizing the output BPP. As shown in FIG. 7B, the deformable mirror 210 may be manipulated (e.g., by altering the angle and/or height of one or more points on its surface) such that phase error is introduced into the input beam 105. The phase error changes the beam quality of the input beam 105, and thus, a fraction of the light spills over into the cladding 130, increasing the output BPP.

As shown in FIGS. 7A and 7B, the deformable mirror 210 and/or the array of actuators deforming portions thereof are responsive to a controller 220, which thereby alters a conformation of the reflective surface of the deformable mirror 210 to introduce phase error into the input beam. The controller 220 may be programmed to achieve the desired phase error (and thus the desired output BPP) via a particular mirror surface conformation without undue experimentation by one of skill in the art.

While the laser systems described above (and all laser systems described herein, unless otherwise indicated) may be utilized with a single input beam or multiple input beams, various embodiments of the present invention advantageously utilize multiple input beams to controllably vary the output BPP of the laser system. FIGS. 8A and 8B depict an exemplary laser system 800 in which a deformable mirror 210 is utilized in conjunction with multiple input beams. FIGS. 8A and 8B depict the use of three input beams 105-1, 105-2, 105-3, but embodiments of the invention may utilize two input beams or more than three input beams, as desired. In laser system 800, the deformable mirror 210 is utilized to alter the point at which one or more of the input beams 105 is focused into the optical fiber 115. As shown in FIG. 8A, in a nominal condition, the input beams 105-1, 105-2, 105-3 are focused by the deformable mirror 210 and the focusing lens 110 to a single focal point and into the core 125 of the fiber 115, thus minimizing the output BPP. As shown in FIG. 8B, the deformable mirror 210 may be manipulated (e.g., by altering the angle and/or height of one or more points on its surface) such that phase error is introduced into the input beam 105-3. The phase error changes the trajectory of the input beam 105-3 as it propagates to and through the focusing lens 110, and thus, the input beam 105-3 is focused to a point different from the focus point of input beams 105-1, 105-2. Thus, at least a portion of the light of input beam 105-3 enters the optical fiber 115 at a point different from that where the light from input beams 105-1, 105-2 enters the fiber, thereby increasing the BPP of the combined output beam. For example, as shown in FIG. 8B, the light of input beam 105-3 may be focused onto the cladding layer 130 (or one or more cladding layers, for multi-clad fibers, and/or one or more other cores, for multi-core fibers), while the light of input beams 105-1, 105-2 may be focused onto the core 125.

As shown in FIGS. 8A and 8B, the deformable mirror 210 and/or the array of actuators deforming portions thereof are responsive to a controller 220, which thereby alters a conformation of the reflective surface of the deformable mirror 210 to introduce phase error into one or more of the input beams. The controller 220 may be programmed to achieve the desired phase error (and thus the desired output BPP) via a particular mirror surface conformation without undue experimentation by one of skill in the art.

The beam quality of the input beams may also be changed (thereby enabling controllable variation of output BPP) via alteration of the spacing between the various input beams. FIGS. 9A and 9B depict an exemplary laser system 900 in which the spacing between the input beams 105-1, 105-2, 105-3 is varied to change the input beam quality (i.e., the divergence) coupled into the optical fiber 115. FIG. 9A depicts the input beams 105-1, 105-2, 105-3 being separated by a relatively narrow spacing 910-1, which results in the input beams being focused into the fiber 115 by focusing lens 110 with a relatively small divergence angle 920-1. The relatively small entrance angle into the fiber 115 results in a smaller output BPP. FIG. 9B depicts the input beams 105-1, 105-2, 105-3 being separated by a spacing 910-2 larger than the spacing 910-1, which results in the input beams being focused into the fiber 115 by focusing lens 110 with a divergence angle 920-2 larger than divergence angle 920-1. The larger entrance angle into the fiber 115 results in a larger output BPP. In this manner, the output BPP of laser system 900 may be varied by varying the spacing between the input beams coupled into the fiber 115. In general, the spacing between the input beams may be varied such that the divergence angle of the focused beams entering the fiber does not exceed the acceptance angle of fiber 115. In various embodiments, the acceptance angle $\theta_{accept}$ of fiber 115 may be calculated by the equation: $n \sin \theta_{accept} = \sqrt{n_{core}^2 - n_{clad}^2}$, where n is the index of refraction of the medium from which the light beam is entering the fiber (for example, the index of refraction of air or of the end cap 120), $n_{core}$ is the index of refraction of the core (or of the central optical axis) of the fiber, and $n_{clad}$ is the index of refraction of the cladding of the fiber.

Figure 9D:
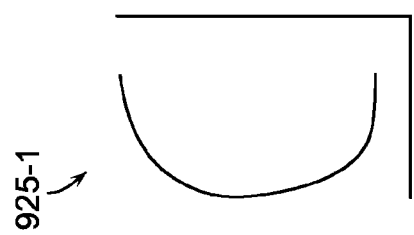
FIG. 9D is a schematic profile of the output beam of the laser system of FIG. 9A.
Figure 9C:
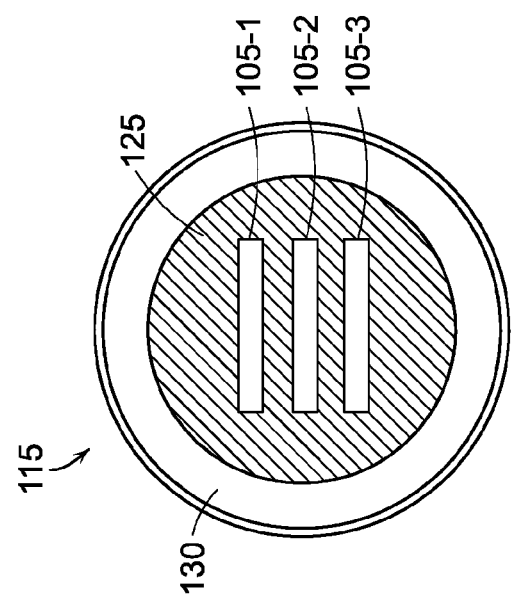
FIG. 9C is a schematic diagram of the input beams at the focusing lens of the laser system of FIG. 9A.

FIG. 9C is a schematic diagram of the three input beams at the focusing lens of the laser system 900 of FIG. 9A, in which the input beams 105-1, 105-2, 105-3 are initially separated by a smaller spacing 910-1. As shown, upon entry into the fiber 115, the three input beams are relatively closely spaced together, reducing (or even minimizing) the output BPP of the laser system. FIG. 9D shows one exemplary profile 925-1 of an output beam of the laser system 900 of FIG. 9A.

In contrast, FIG. 9E is a schematic diagram of the three input beams at the focusing lens of the laser system 900 of FIG. 9B, in which the input beams 105-1, 105-2, 105-3 are initially separated by the larger spacing 910-2. As shown, upon entry into the fiber 115, the three input beams are relatively farther apart, increasing the output BPP of the laser system. FIG. 9F shows an exemplary profile 925-2 of an output beam of the laser system 900 of FIG. 9B.

Figure 9G:
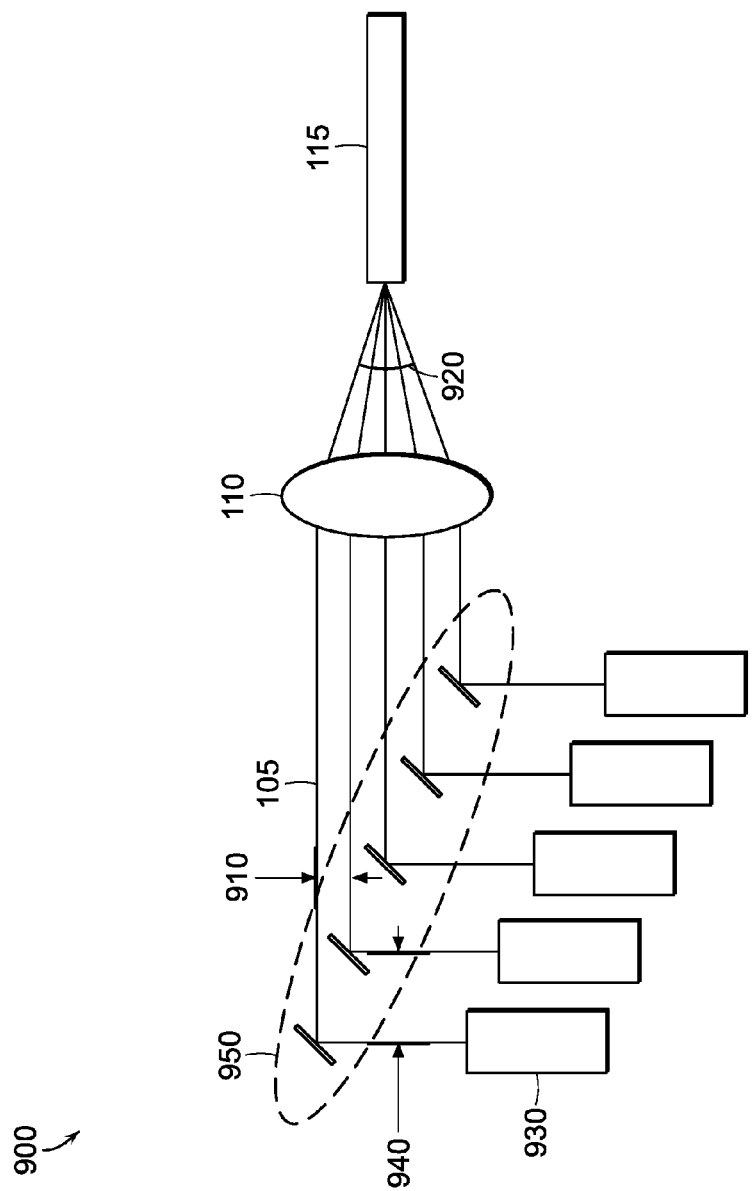
FIG. 9G is a schematic diagram of a laser system incorporating redirecting elements in accordance with embodiments of the invention.

FIG. 9G schematically depicts an exemplary technique for varying the spacing of the input beams of laser system 900. In FIG. 9G, multiple individual emitters 930 each emit an input beam 105, and the input beams 105 are initially propagating with a spacing 940 therebetween. The input beams 105 are redirected by one or more redirecting elements (e.g., mirrors, lenses, etc.) 950 such that, after redirection, the input beams 105 are spaced at a spacing 910 different from (and in FIG. 9G, smaller than) spacing 940. The redirecting elements 950 may be individually or collectively translated and/or rotated to produce a desired spacing 910 between two or more of the input beams 105. As detailed above, the spacing 910 results in an entry angle 920 that directly impacts the output BPP of the laser system 900. The redirecting elements 950 may be individual discrete elements, or they may be individual portions or segments of a larger redirecting element such as a mirror (e.g., a deformable mirror) or a lens. In addition, while the input beams 105 are shown as substantially parallel before and after redirection by redirection elements 950, in various embodiments of the invention, the propagation angle between the input beams may also be varied, thereby varying the points at which the individual beams strike the focusing lens 910 for focusing toward the fiber 115. As shown in FIG. 8B, such arrangements may enable the selective focusing of one or more input beams (or portions thereof) onto different regions of the fiber 115 (e.g., one or more cladding layers and/or one or more cores).

Figure 9H:
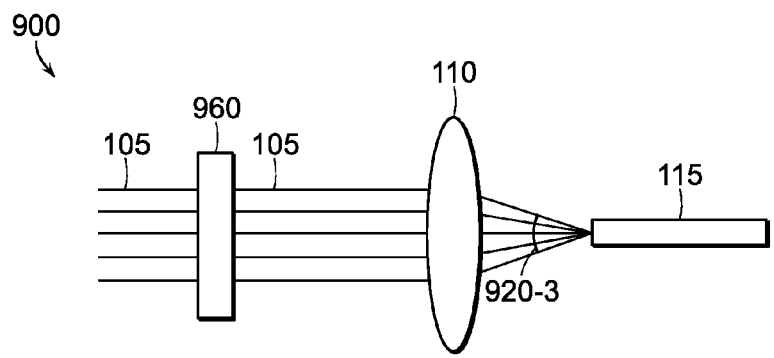
FIGS. 9H-9J are schematic diagrams of laser systems incorporating pathway adjusters in accordance with various embodiments of the invention.
Figure 9I:
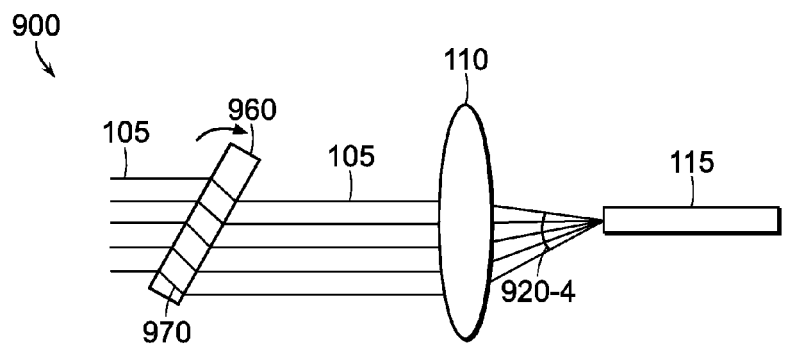

As shown in FIGS. 9H and 9I, the entry angle of the input beams into the optical fiber may be varied even when the spacing between the input beams is substantially unchanged. As shown, a pathway adjuster 960 may be utilized to adjust the propagation path of one or more input beams 105. The pathway adjuster 960 may include or consist essentially of, for example, a prism, a grating, a lens, etc. Although the pathway adjuster 960 is depicted in FIGS. 9H and 9I as a single object, in various embodiments the pathway adjuster 960 includes or consists essentially of a collection of individually controllable (e.g., rotatable and/or translatable) pathway adjusters each receiving one or more input beams (as shown, e.g., in FIG. 9J). As shown in FIG. 9H, in a nominal case, the pathway adjuster 960 does not alter the propagation path of the input beams 105, which are subsequently focused by lens 110 into the fiber 115 with an entry angle 920-3. In FIG. 9I, the pathway adjuster 960 is rotated such that, when the input beams 105 pass through the pathway adjuster 960, they propagate along a path 970 within the pathway adjuster 960 and exit the pathway adjuster 960 having had their propagation path altered. As shown, the input beams 105 subsequently strike the focusing lens 110 in different spatial locations, resulting into their in-coupling into the optical fiber 115 with an entry angle 920-4 different from angle 920-3, thereby altering the output BPP of the laser system 900.

Figure 9J:
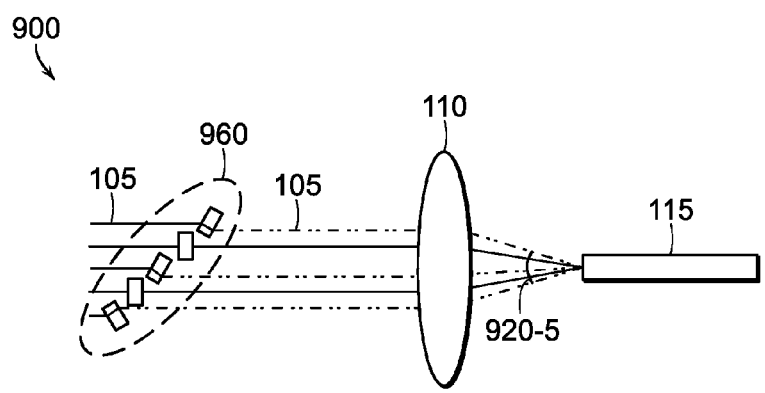

FIG. 9J depicts an exemplary laser system 900 in which the spacing between input beams and the propagation path of individual input beams may both be varied. As shown, each input beam 105 may have its propagation path adjusted by a pathway adjuster 960, thereby changing the spacing between various input beams 105 and/or the locations at which the input beams strike the focusing lens 110 for focusing into the optical fiber 115. In the example shown in FIG. 9J, input beams 105 having their paths adjusted appear as dashed lines, while unadjusted input beams 105 appear as solid lines. Once the input beams 105 strike the focusing lens 110, they are focused into the fiber 115 with an entry angle 920-5 that may vary depending on which (and/or how many) input beams have their paths adjusted and/or to what extent they are adjusted.

The beam quality (and thus BPP) of the output beam of laser systems in accordance with embodiments of the present invention may also be controllably varied by adjusting the power characteristic of one or more of the input beams (which, in turn, impacts the beam quality of the input beam in-coupled into the optical fiber). FIG. 10A depicts an exemplary laser system 1000 in accordance with embodiments of the invention that resembles laser system 900 of FIG. 9B. As shown, the input beams 105-1, 105-2, 105-3 are spaced apart at a particular spacing and focused into the fiber 115 via focusing lens 110. In FIG. 10B, the power characteristic (e.g., output power) of the input beam 105-3 has been reduced, reducing its contribution to the combined beam in-coupled into the fiber 115. This alters the beam quality (and thus the output BPP) of the resulting output beam emitted at the other end of fiber 115. In some embodiments, one or more of the input beams is varied in output power, or even shut off entirely, resulting in changes in the in-coupled beam quality and thus the output BPP of the laser system.

The power characteristic of the input beams may be controlled by a controller 220 that controls the various emitters of each of the input beams. The controller 220 may be programmed to achieve the desired beam conformation (and thus the desired output BPP) via power modulation of one or more of the input beams without undue experimentation by one of skill in the art.

Figure 11A:
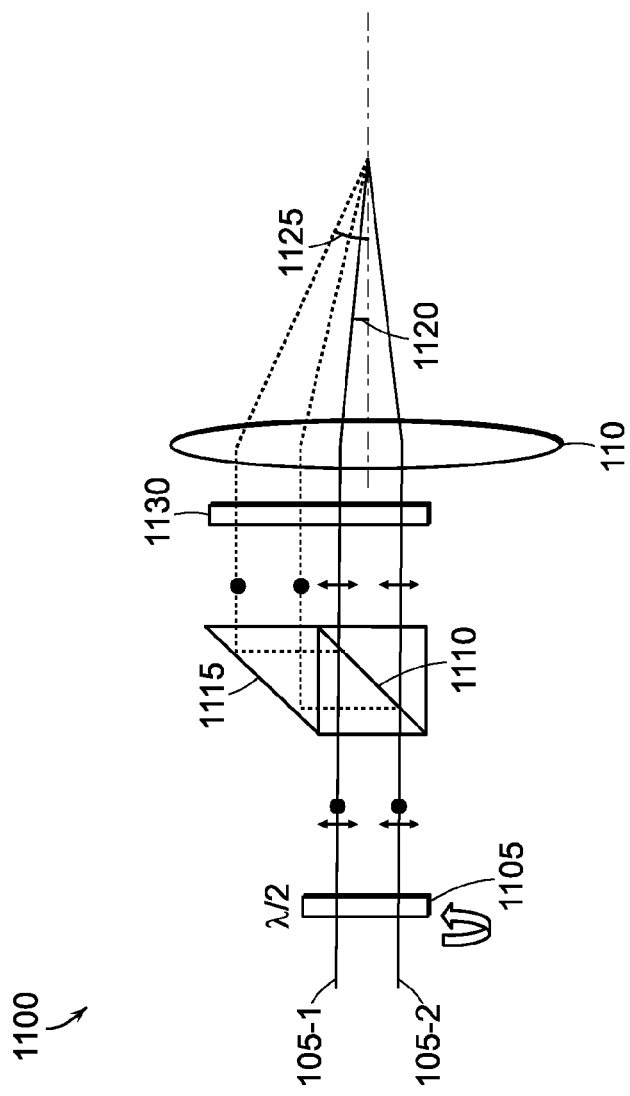
FIG. 11A is a schematic diagram of a laser system in which input beam quality is adjusted on the basis of polarization in accordance with various embodiments of the invention.
Figure 11B:
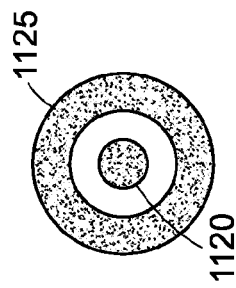
FIG. 11B is a schematic plot of power distribution as a function of input numerical aperture for the laser system of FIG. 11A.

In various embodiments of the present invention, input beam quality is varied (leading to variation in output BPP) on the basis of the polarization state of the input beams. Specifically, input beams may be separated into components having different polarization states and recombined into input beams having desired power levels. Then, one or more of the recombined beams may be focused onto one region of the optical fiber (e.g., the core) while one or more other recombined beams may be focused onto a different region of the optical fiber (e.g., the cladding), resulting in an output beam having a BPP adjustable on the basis of the ratio of power levels of the two recombined beams. FIG. 11A depicts an exemplary laser system 1100 in which two linearly polarized input beams 105-1, 105-2 are manipulated on the basis of polarization. As shown, the two input beams pass through a half-wave plate 1105, which alters the polarization direction of the light of the input beams. Specifically, rotation of the half-wave plate 1105 allocates the power of each of the input beams into one of two different polarization states, e.g., s-polarized (or simply "S") and p-polarized (or simply "P"). As known in the art, p-polarized light has its electric field along the plane of incidence (i.e., the plane made by the propagation direction and a vector perpendicular to the plane of a reflecting surface), while s-polarized light has its electric field normal to the plane of incidence. The half-wave plate 1105 typically includes or consists essentially of a birefringent material (such as quartz or mica), the index of refraction of which is different for different orientations of light passing through it. After passing through the half-wave plate 1105, the input beams are split into S and P components by a polarizer beam splitter 1110 (e.g., a thin-film polarizer or a Wollaston prism), components the relative power of which was selected by the rotation of the half-wave plate 1105. (Note that S and P are designations for any two polarization states that are selectable in this manner.) As shown, the P light passes straight through the polarizer beam splitter 1110, while the S light is split away and directed toward a reflector 1115. Both S and P light are then directed to the focusing lens 110 for focusing into the optical fiber (the optical fiber 115 is not depicted in FIG. 11A and subsequent figures for clarity). The P light may be focused into the optical fiber (e.g., into its core) with a small numerical aperture (or divergence or entry angle) 1120, while the S light, spatially separated from the P light, may be focused into the optical fiber (e.g., into its cladding) with a larger numerical aperture 1125. In this manner, the contributions of the S and P light to the combined output beam (and thus its BPP) may be varied simply by allocating power to the input beams via the half-wave plate 1105. In some embodiments, the S light is focused onto the fiber core while the P light is focused onto the fiber cladding. In other embodiments, after the input beams have been separated on the basis of polarization, and their relative powers allocated via half-wave plate 1105, the S and P light may be directed through a polarization scrambler 1130 that depolarizes the different light beams (e.g., imparts the beams with random polarizations or with both S and P polarizations) before they are focused into different locations of the fiber. The polarization scrambler may include or consist essentially of, for example, a quarter-wave plate. FIG. 11B depicts a schematic plot of the input-beam power within the numerical apertures 1120, 1125 for the laser system 1100 of FIG. 11A.

Figure 11C:
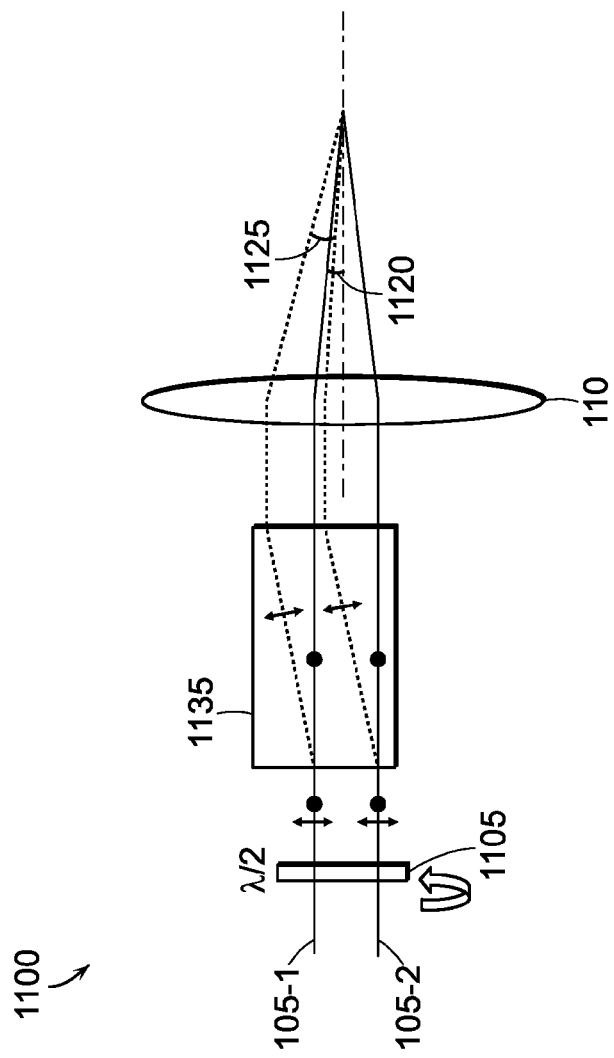
FIG. 11C is a schematic diagram of a laser system in which input beam quality is adjusted on the basis of polarization in accordance with various embodiments of the invention.
Figure 11D:
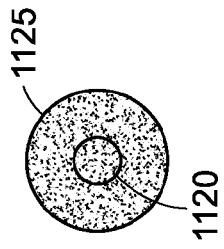
FIG. 11D is a schematic plot of power distribution as a function of input numerical aperture for the laser system of FIG. 11C.

Although the laser system 1100 of FIG. 11A separates input beams, by polarization state, into beams that are in-coupled into an optical fiber substantially free of spatial overlap, the beams may also be partially overlapped, as shown in FIG. 11C. In FIG. 11C, the power of the input beams 105-1, 105-2 is again allocated between S and P polarizations via a desired rotation of the half-wave plate 1105, and the resulting beams are split into S and P components by a beam displacer 1135. The beam displacer 1135, which in general splits unpolarized light into polarized beams having orthogonal polarizations and propagating at different angles, may include or consist essentially of a uniaxial crystal of a material such as yttrium vanadate (YVO$_4$), barium borate (α-BBO), calcite crystal, or rutile. The S and P components of the input beams are focused by the focusing lens 110 onto different but overlapping regions of the optical fiber, where the S light is focused into the optical fiber (e.g., into its core) with a small numerical aperture (or divergence or entry angle) 1120, while the P light is focused into the optical fiber (e.g., into the cladding and a portion of the core) with a larger numerical aperture 1125, with the P light overlapping the S light upon entry into the fiber. FIG. 11D schematically depicts the power distribution between the numerical apertures 1120, 1125, showing the overlap between the two beam components. As in laser system 1100 of FIG. 11A, the output BPP may be variably selected via the relative allocation of the input beam power into S and P components by the half-wave plate 1105.

Figure 11E:
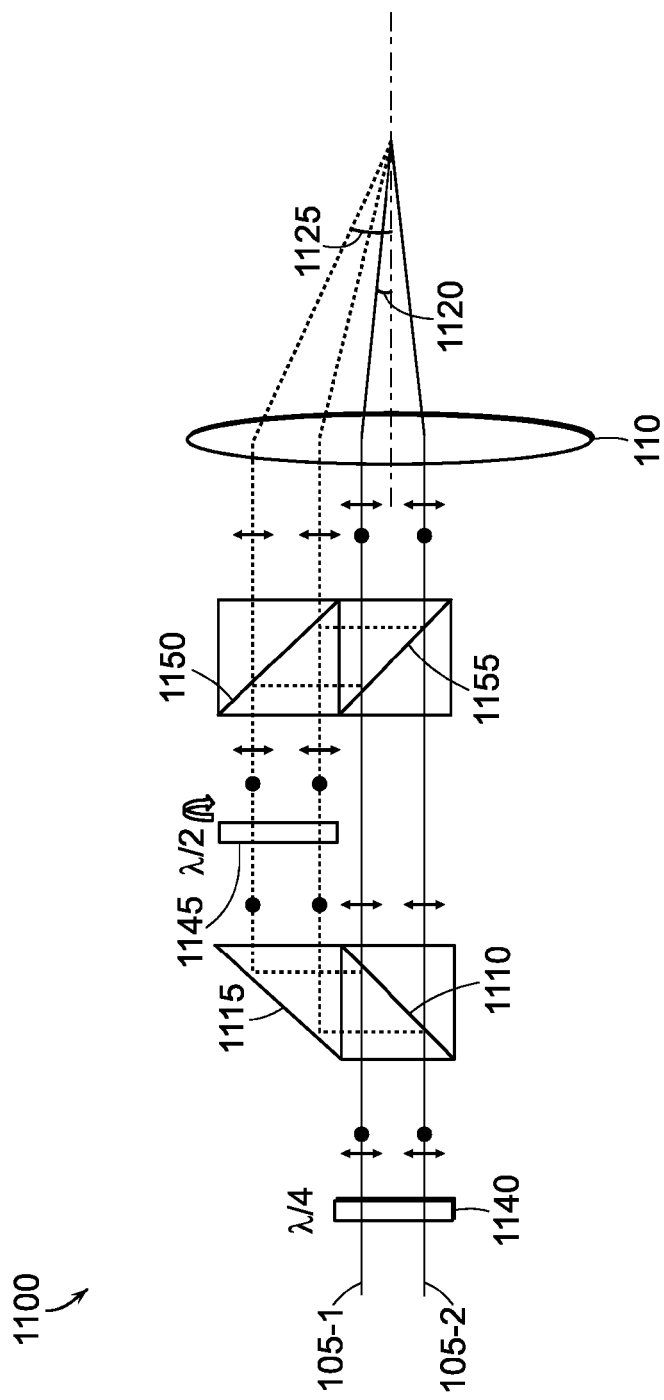

FIG. 11E depicts an exemplary laser system 1100 in accordance with embodiments of the present invention in which up to 50% of the total power of the input beams 105-1, 105-2 may be allocated to the larger numerical aperture 1125 of the optical fiber, the remaining portion being allocated to the smaller numerical aperture 1120. In FIG. 11E, the input beams 105-1, 105-2 are initially randomly polarized and/or are passed through an optional polarization randomizer 1140 (e.g., a quarter-wave plate). As in FIG. 11A, the input beams are then split by polarization beam splitter 1110 into S and P components, and the S components are directed toward reflector 1115. The reflected S components are then repolarized into light beams having both S and P polarizations by a half-wave plate 1145, which is rotated to select the relative amount of S and P polarization in the resulting light beams. The repolarized light beams are directed to a second polarization beam splitter 1150, which passes the P components of the light beams to the focusing lens 110 for focusing into the larger numerical aperture 1125. In this manner, up to 50% of the power of the original input beams 105-1, 105-2 (i.e., up to 100% of the power initially split into S polarization by the polarization beam splitter 1110) may be allocated to the larger numerical aperture 1125. The S light from the half-wave plate 1145 is directed from polarization beam splitter 1150 to another polarization beam splitter 1155, where it is recombined with the P light exiting the initial polarization beam splitter 1110. As shown, that combined light is focused into the smaller numerical aperture 1120.

Figure 11F:
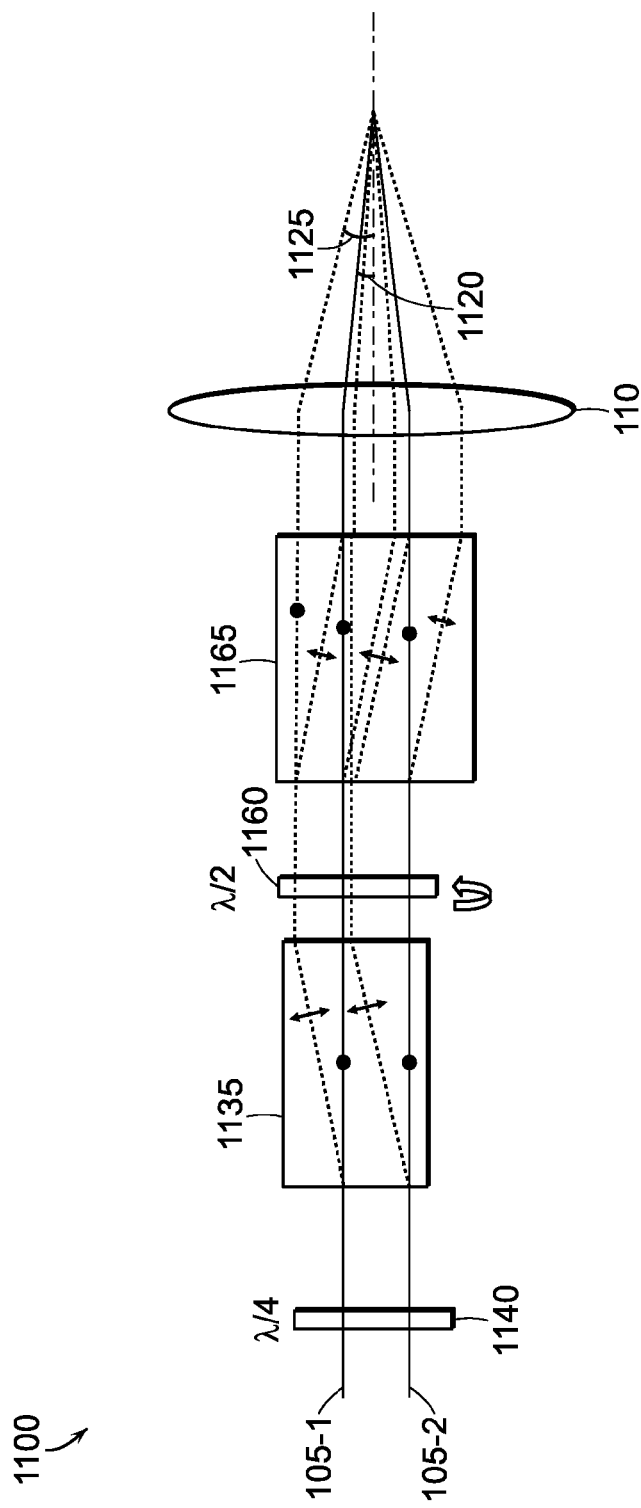

Similarly to FIG. 11C, a laser system 1100 having randomly polarized input beams may also allocate light power between two numerical apertures with overlap of the light. FIG. 11F depicts such an exemplary laser system 1100, in which the input beams 105-1, 105-2 are initially randomly polarized and/or are passed through an optional polarization randomizer 1140 (e.g., a quarter-wave plate). As in FIG. 11C, the beams are directed to beam displacer 1135, which splits the input beams into S and P components. These components pass through a half-wave plate 1160 and then propagate to a beam combiner 1165. The beam combiner 1165, which typically includes or consists essentially of the same optical component as beam displacer 1135, only utilized in the opposite manner, recombines S and P components at its output. As shown, rotation of the half-wave plate 1160 allocates the initial power of input beams 105-1, 105-2 in full or in part to each of the smaller numerical aperture 1120 and the larger numerical aperture 1125 (once the light is focused by the focusing lens 110).

FIGS. 11G and 11H schematically depict the two extreme cases of the laser system 1100 depicted in FIG. 11F. In FIG. 11G, the half-wave plate 1160 is rotated at, for example, 0 degrees or 90 degrees, and thus all of the initial power of the input beams 105-1, 105-2 is allocated to the smaller numerical aperture 1120. In FIG. 11H, the half-wave plate 1160 is rotated at, for example, 45 degrees, and thus all of the initial power of the input beams 105-1, 105-2 is allocated to the larger numerical aperture 1125.

In accordance with various embodiments of the present invention, input-beam light may be separated on the basis of polarization for power allocation among different cladding layers of a multi-cladding optical fiber. FIG. 11I depicts an exemplary laser system 1100 similar to that of FIG. 11A, except that the reflector 1115 is tilted so that the separated S and P components propagate toward the focusing lens 110 at a non-zero angle 1170 therebetween (rather than propagating parallel to each other). As described above, rotation of the half-wave plate 1105 allocates the total power of the input beams 105-1, 105-2 between the two polarization states, one of which is focused to a point 1175 (e.g., to the core of the optical fiber), and the other of which (due to the angle 1170) is focused to a point 1180 different than point 1175 (e.g., to a cladding layer, for example an outer cladding layer surrounding an inner cladding layer, of the optical fiber). Similarly, FIG. 11J depicts an exemplary laser system 1100 similar to that of FIG. 11C, except that a surface 1185 of the beam displacer is cut at an angle (or "wedged") so that the separated S and P components propagate toward the focusing lens 110 at a non-zero angle 1170 therebetween (rather than propagating parallel to each other). As described above, rotation of the half-wave plate 1105 allocates the total power of the input beams 105-1, 105-2 between the two polarization states, one of which is focused to a point 1175 (e.g., to the core of the optical fiber), and the other of which (due to the angle 1170) is focused to a point 1180 different from point 1175. FIG. 11K depicts an exemplary plot of power distribution in the spatial domain within the fiber 115 for the laser systems 1100 depicted in FIGS. 11I and 11J. As shown, the light directed to point 1175 is in-coupled into the core 125 of the fiber, while the light directed to point 1180 is coupled into a second cladding layer 130-2 that surrounds a first cladding layer 130-1. In other embodiments, light directed to point 1180 may be coupled into a second core or a different cladding of a multi-core/multi-cladding fiber. While these examples are variants of the laser systems of FIGS. 11A and 11C utilizing linearly polarized input light, the same principle may be applied to the systems of FIGS. 11E and 11F utilizing randomly polarized input light.

Figure 12A:
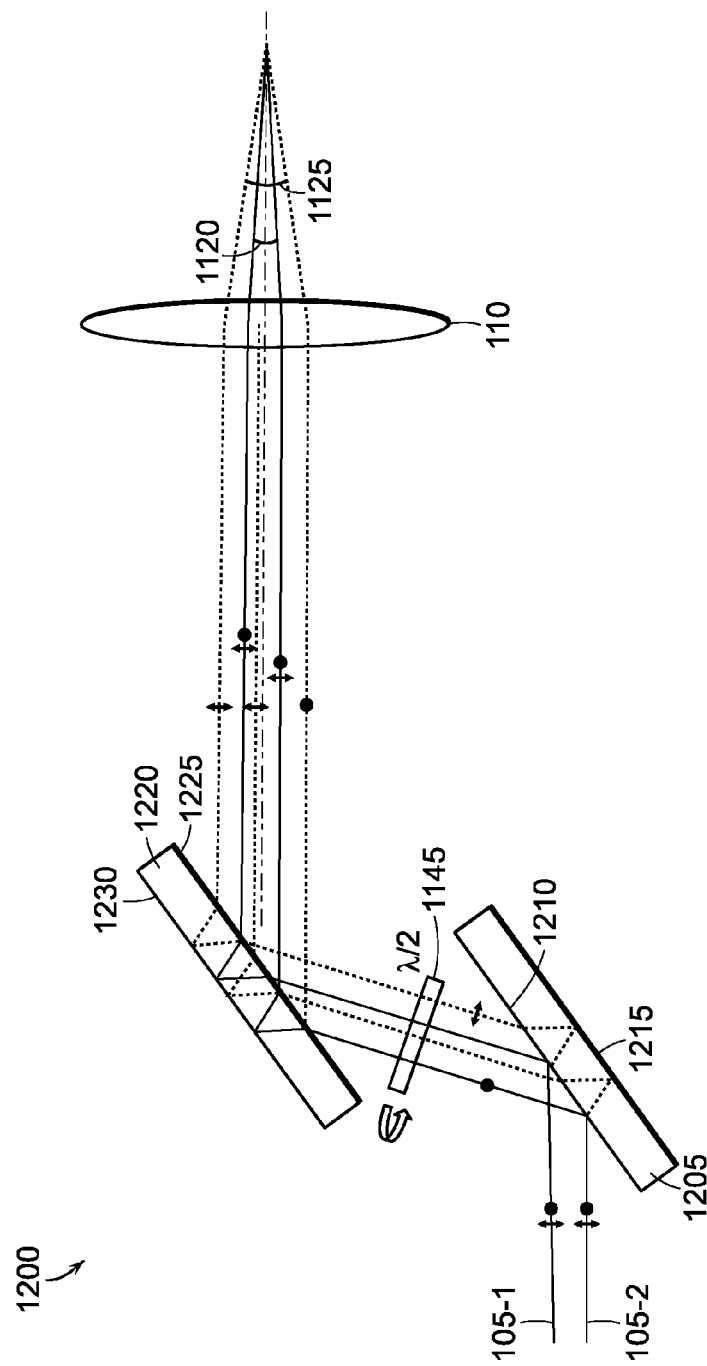
FIGS. 12A-12C are schematic diagrams of laser systems in which input beam quality is adjusted on the basis of polarization in accordance with various embodiments of the invention.

FIG. 12A depicts an exemplary laser system 1200 that is functionally similar to the laser system 1100 depicted in FIG. 11E, in that the rotation of half-wave plate 1145 allocates the total power of input beams 105-1, 105-2 fully or partially to a smaller numerical aperture 1120 or to a larger numerical aperture 1125. In the laser system 1200 of FIG. 12A, the input beams, which may either be randomly polarized or initially pass through a polarization randomizer such as a quarter-wave plate (not shown) propagate to a substantially optically transparent plate 1205 having a polarization beam splitting surface 1210 and a highly reflective surface 1215. As shown, the polarization beam splitting surface 1210 splits the input beams into S and P components, the S component reflecting from the polarization beam splitting surface 1210 toward half-wave plate 1145 and the P component propagating through the plate 1205 and being reflected toward half-wave plate 1145 by reflective surface 1215. As described herein, rotation of the half-wave plate 1145 allocates the total power to the S and P components, which then propagate to a second substantially optically transparent plate 1220 having a polarization beam splitting surface 1225 and a highly reflective surface 1230. As shown, the plate 1220 (and/or its reflective and/or polarization beam splitting surfaces) is generally parallel to the plate 1205 (and/or its reflective and/or polarization beam splitting surfaces). The interaction of the light with the surfaces 1225, 1230 of plate 1220 redistributes the light, allocated via half-wave plate 1145, into components focused by focusing lens 110 into the smaller numerical aperture 1120 and the larger numerical aperture 1125.

Figure 12B:
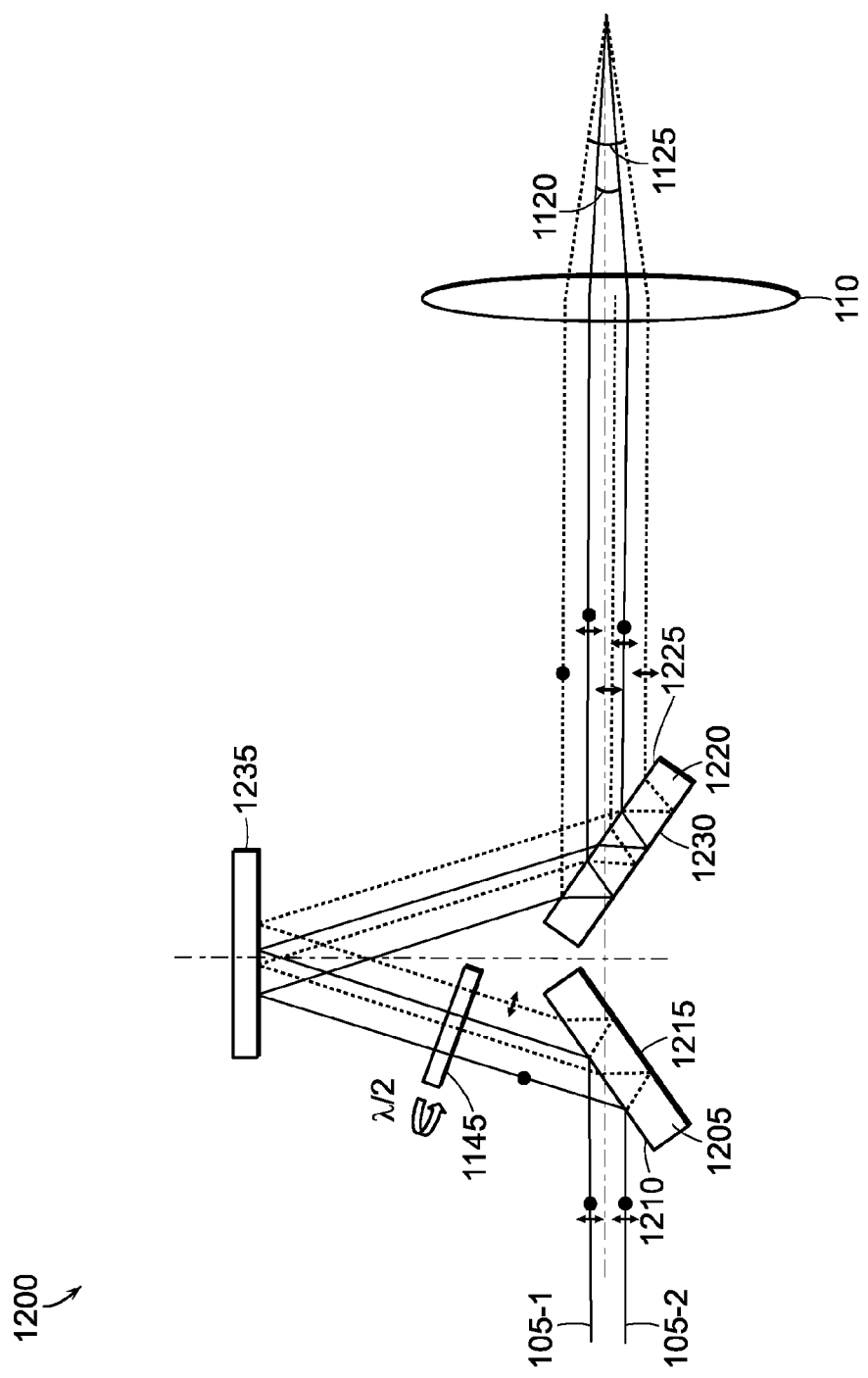

FIG. 12B depicts an exemplary laser system 1200 in accordance with embodiments of the invention that is similar to the laser system 1200 of FIG. 12A. In the laser system 1200 of FIG. 12B, the substantially optically transparent plates 1205, 1220 (and/or their reflective and/or polarization beam splitting surfaces) are arranged at opposite angles, i.e., angles the same rotational distance from zero degrees but in opposite directions. Such arrangements may result in the plates being more easily configured with respect to each other, and the light entering the focusing lens 110 propagates generally along the same path as that of the original input beams 105-1, 105-2. As in laser system 1200 of FIG. 12A, the input beams 105-1, 105-2 propagate to the plate 1205, split into S and P components and reflect toward the half-wave plate 1145. Rotation of the half-wave plate 1145 allocates power between the S and P components, which are then reflected toward plate 1220 by a reflector 1235. As in laser system 1200 of FIG. 12A, the allocated beams are focused by focusing lens 110 into the smaller numerical aperture 1120 and the larger numerical aperture 1125.

Figure 12C:
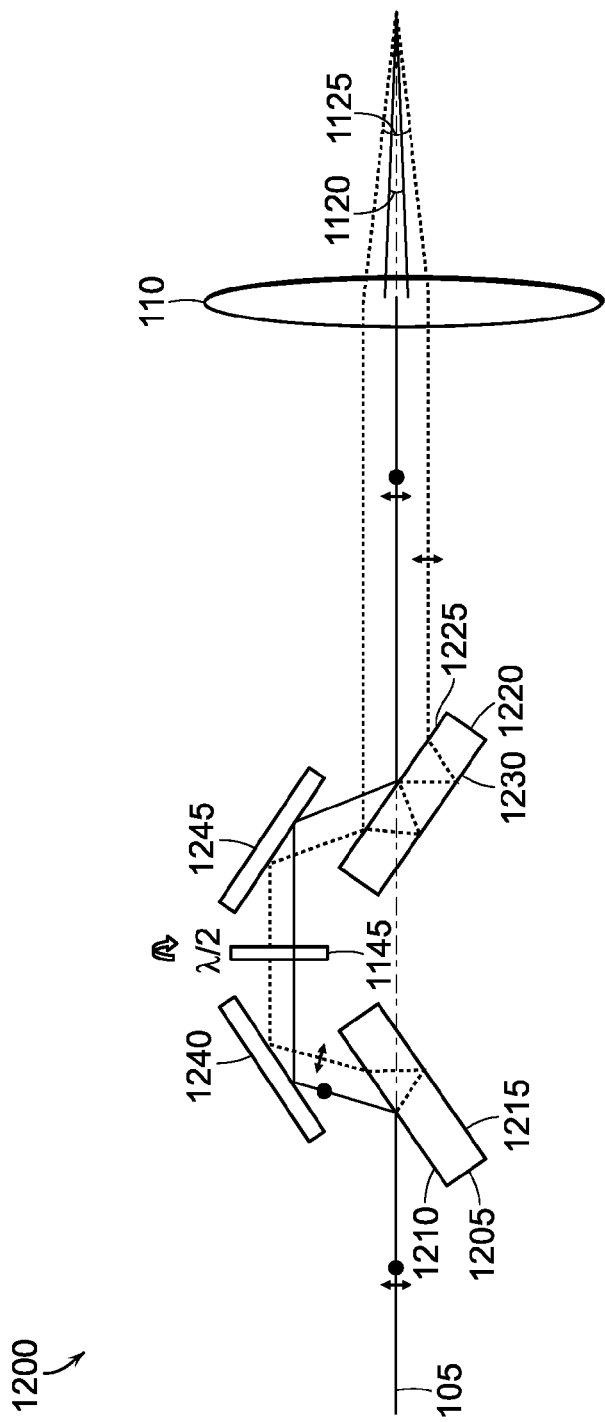

FIG. 12C depicts a similar laser system 1200 in accordance with various embodiments of the invention. As shown, the input beam 105 is directed toward plate 1205, split into S and P components, which are reflected to a reflector 1240 and thence to the half-wave plate 1145. Rotation of the half-wave plate 1145 allocates power between the S and P components, which are then reflected toward plate 1220 by a reflector 1245. In the laser system 1200 of FIG. 12C, the plates 1205, 1220 and/or the reflectors 1240, 1245 are disposed at opposite angles. As in laser system 1200 of FIG. 12A, the allocated beams are focused by focusing lens 110 into the smaller numerical aperture 1120 and the larger numerical aperture 1125.

Figure 13A:
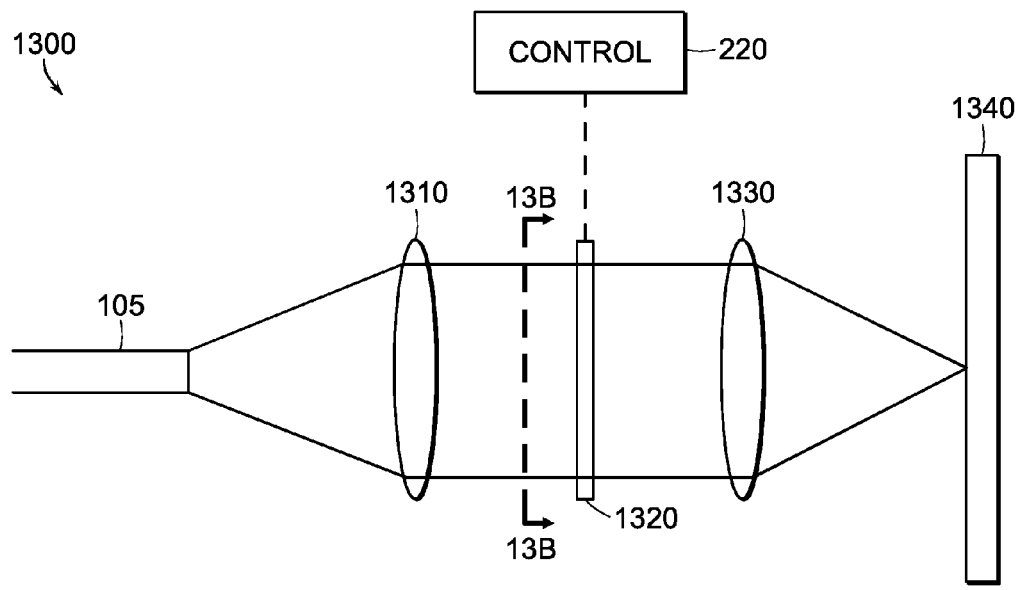
FIGS. 13A and 13B are schematic diagrams of laser systems in which input beam quality is adjusted via use of a thermo-optic element in accordance with various embodiments of the invention.
Figure 13B:
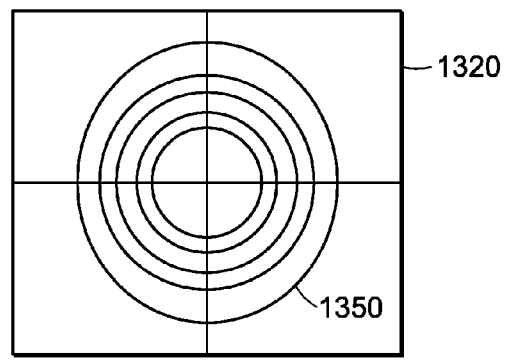

As detailed herein, the BPP of an output beam that exits an optical fiber or optical waveguide system may be manipulated by localized application of infrared radiation (i.e., heat). In accordance with various embodiments of the present invention, local heating (and concomitant local changes in refractive index) of a thermo-optic element are utilized to alter the BPP of a laser beam before it is propagated to, for example, a work piece or the input facet of an optical fiber. FIGS. 13A and 13B depict an exemplary laser system 1300 in which the input beam 105 (which may be, for example, the output of a WBC laser system as detailed herein, or another laser beam emitted from an optical fiber or from free space) is directed by an optical element 1310 onto a thermo-optic element 1320, which may be utilized to adjust the BPP of the beam 105. The adjusted beam propagates to an optical element 1330, which focuses the beam onto a workpiece 1340. Each of the optical elements 1310, 1330 may include or consist essentially of, e.g., one or more lenses. The workpiece 1340 may include or consist essentially of, e.g., an object to be processed via a technique such as laser manufacturing, laser cutting, laser annealing, laser soldering, or laser welding, or the workpiece 1340 may include or consist essentially of an optical fiber (e.g., fiber 115). The laser system 1300 may be a portion of, and/or contained within, part of a laser processing system such as a "laser cutting head."

The thermo-optic element 1320 may include or consist essentially of a material exhibiting localized changes in refractive index upon application of localized heating. In various embodiments, in the absence of localized heating (i.e., heating of a portion of thermo-optic element 1320 above ambient temperature), the thermo-optic element 1320 has substantially no effect on the BPP of input beam 105. In various embodiments, the thermo-optic element 1320 includes, consists essentially of, or consists of fused silica (e.g., in the form of a lens or a plate or an optical flat). The thermo-optic element 1320 (and localized heating thereof, via, e.g., heating elements on or near thermo-optic element 1320) may be controlled, via controller 220, to produce an optical distortion pattern 1350, as shown in FIG. 13B. (The optical distortion pattern 1350 shown in FIG. 13B is an exemplary representation of the localized changes in temperature (and/or refractive index) within thermo-optic element 1320 and is shown in the figures for clarity; the actual pattern may not be visible to the human eye during operation of laser systems in accordance with embodiments of the present invention. In some embodiments, all or a portion of the pattern 1350 is accompanied by small physical distortions of the thermo-optic element 1320 that may or may not be visible to the human eye.) Controller 220 may be conventional, and may be configured to locally heat thermo-optic element 1320 in response to a desired output BPP without undue experimentation. The heat-induced local changes in refractive index of thermo-optic element 1320 alter the BPP of the beam 105 (typically by increasing it) to a desired BPP, whereupon the modified beam is directed to the workpiece 1340 by optical element 1330.

Figure 14A:
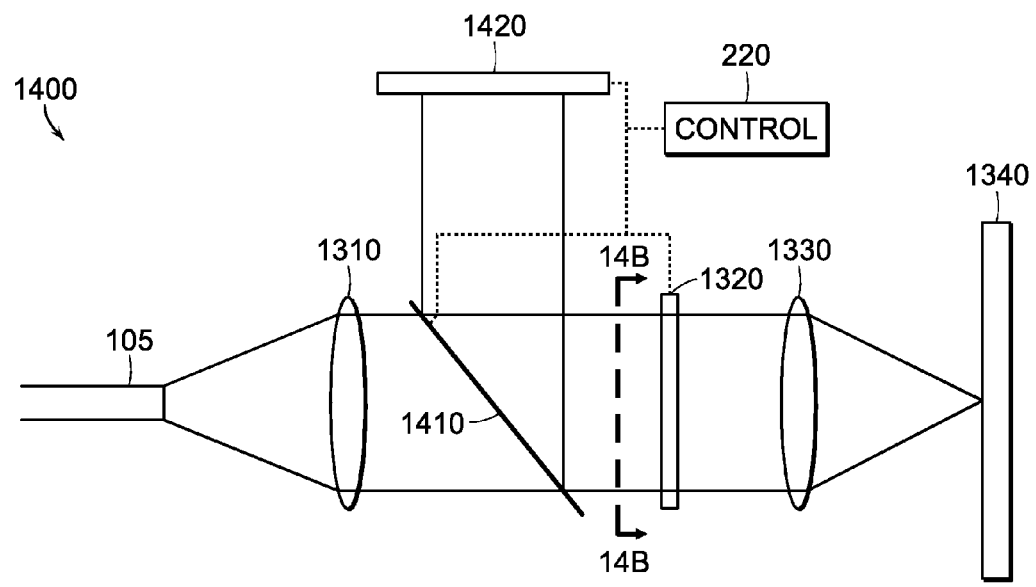
FIGS. 14A and 14B are schematic diagrams of laser systems in which input beam quality is adjusted via use of a thermo-optic element in accordance with various embodiments of the invention.
Figure 14B:
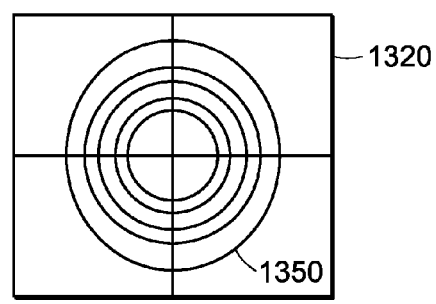

FIGS. 14A and 14B depict another exemplary laser system 1400 in accordance with various embodiments of the present invention. As shown, laser system 1400 features a mirror 1410 (e.g., a dichroic mirror) that is utilized to direct a localized heating pattern emanating from heat source 1420 onto the thermo-optic element 1320 in order to produce the optical distortion pattern 1350. The heat source 1420 may include or consist essentially of, for example, an array of small heaters (e.g., diode heaters) that are individually controllable to produce the desired heating pattern that produces pattern 1350 on thermo-optic element 1320. In other embodiments, the heat source 1420 may incorporate (or be incorporated within) an imaging system that includes one or more masks. Each mask includes areas opaque to infrared radiation and other areas substantially transparent to infrared radiation. Thus, radiation emitted by heat source 1420 may be blocked in selected areas, thereby forming a desired heating pattern. In yet other embodiments, the heat source 1420 may incorporate (or be incorporated within) an imaging system that includes multiple lenses and/or other optical elements that intercept radiation emitted by heat source 1420 and focus it only onto desired areas of mirror 1410 (and thence to thermo-optic element 1320), thereby forming the desired pattern. As shown in FIG. 14A, the heat source 1420, mirror 1410, and/or thermo-optic element 1320 may be responsive to controller 220. Controller 220 may be conventional, and may be configured to produce a localized heating pattern via heat source 1420 and/or mirror 1410, and thus a resulting optical distortion pattern 1350 in thermo-optic element 1320, in response to a desired output BPP without undue experimentation.

Figure 15A:
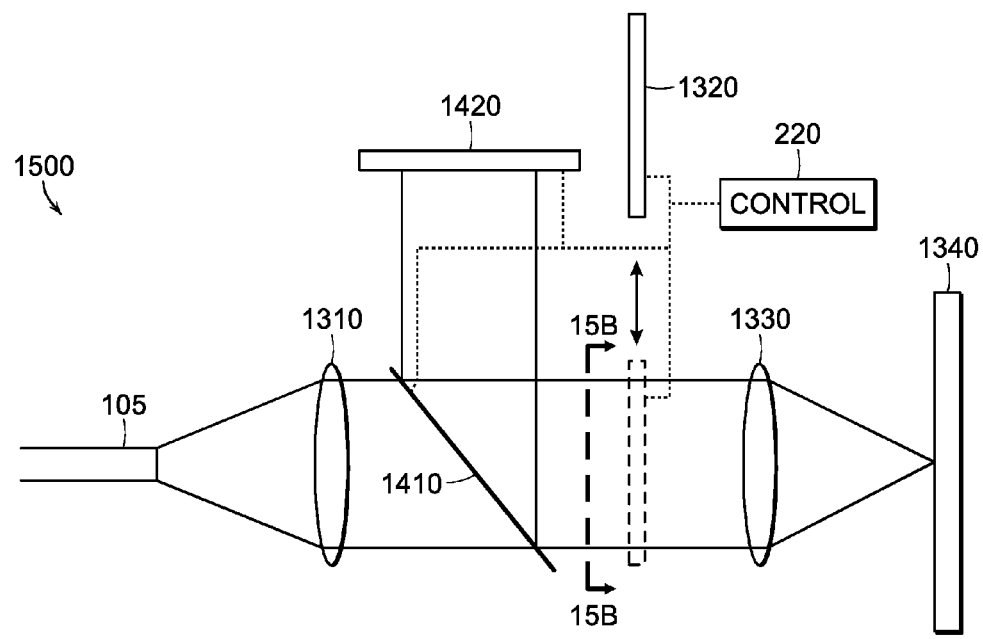
FIGS. 15A and 15B are schematic diagrams of laser systems in which input beam quality is adjusted via use of a thermo-optic element in accordance with various embodiments of the invention.
Figure 15B:
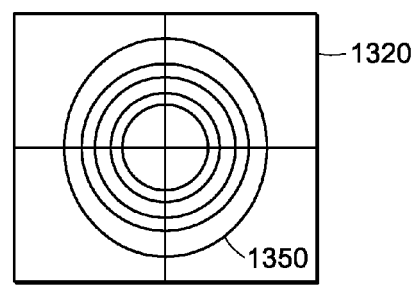

FIGS. 15A and 15B depict another exemplary laser system 1500 in accordance with various embodiments of the present invention. As shown, laser system 1500 features one or more thermo-optic elements 1320 that are movable, replaceable, removable, and/or interchangeable to enable multiple different manipulations of the BPP of input beam 105. The thermo-optic element 1320 may be removed from the optical path of the beam 105 entirely, thus resulting in little or no impact on the BPP of beam 105 before it is propagated to workpiece 1340. The thermo-optic element 1320 may be replaced or augmented with another, different thermo-optic element in order to further manipulate the BPP of the incident beam. For example, the new or added thermo-optic element may have a different thickness, and include, consist essentially of, or consist of a material different from that of the initial thermo-optic element 1320, or may have a different shape. Thus, the new thermo-optic element (or the combination of the new thermo-optic element with thermo-optic element 1320) will result in a different alteration of the BPP of the input beam 105. Different thermo-optic elements may be rotated or alternated in and out of the optical path of the beam; for example, the various thermo-optic elements may be mounted on a track or a conveyor system to facilitate movement and interchangeability thereof.

Figure 16:
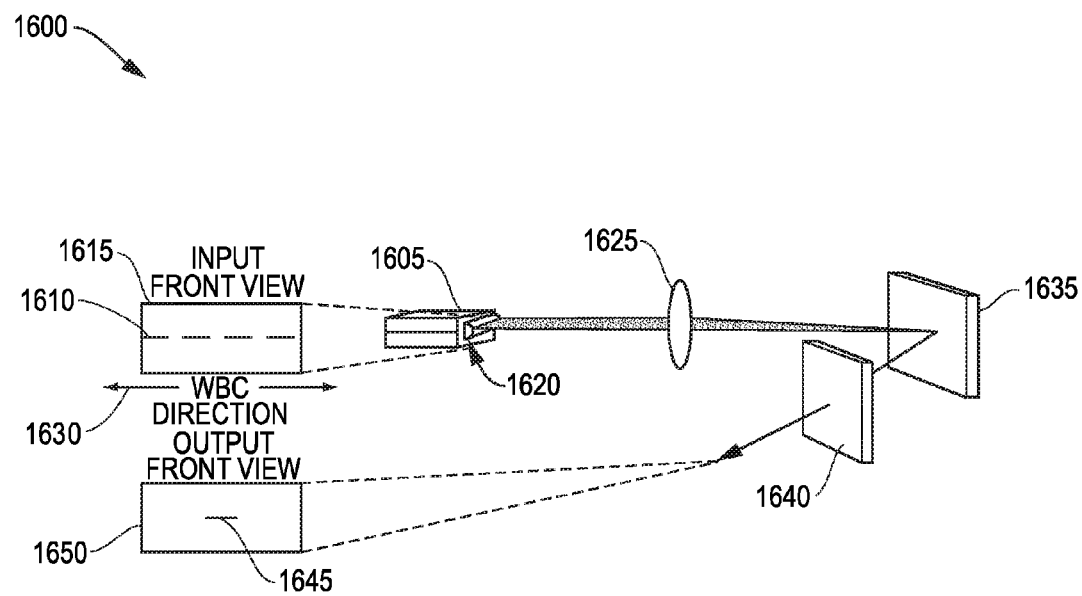
FIG. 16 is a schematic diagram of a wavelength beam combining system in accordance with various embodiments of the invention.

Laser systems and laser delivery systems in accordance with embodiments of the present invention and detailed herein may be utilized in and/or with WBC laser systems. FIG. 16 depicts an exemplary WBC laser system 1600 that utilizes one or more lasers 1605. In the example of FIG. 16, laser 1605 features a diode bar having four beam emitters emitting beams 1610 (see magnified input view 1615), but embodiments of the invention may utilize diode bars emitting any number of individual beams or two-dimensional arrays or stacks of diodes or diode bars. In view 1615, each beam 1610 is indicated by a line, where the length or longer dimension of the line represents the slow diverging dimension of the beam, and the height or shorter dimension represents the fast diverging dimension. A collimation optic 1620 may be used to collimate each beam 1610 along the fast dimension. Transform optic(s) 1625, which may include or consist essentially of one or more cylindrical or spherical lenses and/or mirrors, are used to combine each beam 1610 along a WBC direction 1630. The transform optics 1625 then overlap the combined beam onto a dispersive element 1635 (which may include or consist essentially of, e.g., a reflective or transmissive diffraction grating, a dispersive prism, a grism (prism/grating), a transmission grating, or an Echelle grating), and the combined beam is then transmitted as single output profile onto an output coupler 1640. The output coupler 1640 then transmits the combined beams 1645 as shown on the output front view 1650. The output coupler 1640 is typically partially reflective and acts as a common front facet for all the laser elements in this external cavity system 1600. An external cavity is a lasing system where the secondary mirror is displaced at a distance away from the emission aperture or facet of each laser emitter. In some embodiments, additional optics are placed between the emission aperture or facet and the output coupler or partially reflective surface. The output beam 1645 is a thus a multiple-wavelength beam (combining the wavelengths of the individual beams 1610), and may be utilized as input beam 105 in laser systems detailed herein and coupled into an optical fiber (e.g., fiber 115) or propagated to a workpiece (e.g., workpiece 1340). Beam 1645 (or the output of optical fiber 115) may also be utilized as the input beam (e.g., source laser 105) for laser systems 1300, 1400, and 1500 depicted in FIGS. 13A, 14A, and 15A.

The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A beam-parameter adjustment system and focusing system for receiving and altering a spatial power distribution of a radiation beam from a beam source and focusing the radiation with the altered spatial power distribution onto a workpiece, the system comprising:
- a thermo-optic element for receiving the radiation beam and propagating the radiation beam toward the workpiece;
- a heat source for heating portions of the thermo-optic element to alter refractive indices thereof, thereby forming an optical distortion pattern within the thermo-optic element;
- focusing optics for receiving the radiation beam from the thermo-optic element and focusing the radiation beam on the workpiece;
- a controller for controlling the thermo-optic element and/or the heat source to achieve a target altered spatial power distribution on the workpiece, the target altered spatial power distribution resulting at least in part from interaction between the radiation beam and the optical distortion pattern within the thermo-optic element; and
- disposed optically downstream of the heat source and optically upstream of the thermo-optic element, a masking element comprising (i) one or more areas substantially transparent to radiation from the heat source and (ii) one or more areas substantially opaque to radiation from the heat source.

2. The system of claim 1, further comprising an optical element for directing the radiation beam onto the thermo-optic element.

3. The system of claim 2, wherein the optical element comprises one or more lenses and/or one or more mirrors.

4. The system of claim 1, wherein the thermo-optic element comprises fused silica.

5. The system of claim 1, wherein the workpiece comprises an end face of an optical fiber.

6. The system of claim 1, wherein the workpiece comprises a metallic object.

7. The system of claim 1, wherein the focusing optics comprise one or more lenses.

8. The system of claim 1, wherein the heat source comprises a plurality of individually controllable heating elements each configured to heat a different portion of the thermo-optic element.

9. The system of claim 1, further comprising a mirror for directing radiation from the heat source to the thermo-optic element.

10. The system of claim 9, wherein the mirror comprises a dichroic mirror.

11. The system of claim 1, wherein the radiation beam is a multi-wavelength beam.

12. A method of manipulating a radiation beam from a beam source, the method comprising:
- applying heat to one or more portions of a thermo-optic element, thereby forming an optical distortion pattern within the thermo-optic element;
- receiving the radiation beam with the thermo-optic element, a spatial power distribution of the radiation beam being altered in response to the optical distortion pattern within the thermo-optic element; and
- focusing the radiation beam with the altered spatial power distribution toward a workpiece,
- wherein applying heat to one or more portions of the thermo-optic element comprises (i) generating radiation at a heat source and directing the radiation toward the thermo-optic element, (ii) blocking one or more first portions of the radiation, thereby preventing the one or more first portions from heating the thermo-optic element, and (iii) allowing one or more second portions of the radiation to propagate to the thermo-optic element.

13. The method of claim 12, wherein the radiation beam is a multi-wavelength beam.

14. The method of claim 12, wherein applying heat to one or more portions of the thermo-optic element comprises heating each portion of the thermo-optic element with an individually controllable heating element.

15. The method of claim 12, wherein applying heat to one or more portions of the thermo-optic element comprises (i) generating radiation in a spatially varying heating pattern, and (ii) directing the radiation toward the thermo-optic element, the heating pattern generating the optical distortion pattern in the thermo-optic element.

16. A laser system comprising:
- an array of beam emitters each emitting a beam;
- focusing optics for focusing the beams toward a dispersive element;
- a dispersive element for receiving and dispersing the focused beams, thereby forming a multi-wavelength beam;
- a partially reflective output coupler for receiving the multi-wavelength beam, reflecting a first portion thereof back toward the dispersive element, and transmitting a second portion thereof as an output beam composed of multiple wavelengths;
- a thermo-optic element for receiving the output beam and propagating the output beam toward a workpiece;
- a heat source for heating portions of the thermo-optic element to alter refractive indices thereof, thereby forming an optical distortion pattern within the thermo-optic element;
- second focusing optics for receiving the output beam from the thermo-optic element and focusing the output beam on the workpiece; and
- disposed optically downstream of the heat source and optically upstream of the thermo-optic element, a masking element comprising (i) one or more areas substantially transparent to radiation from the heat source and (ii) one or more areas substantially opaque to radiation from the heat source.

17. The laser system of claim 16, further comprising a controller for controlling the thermo-optic element and/or the heat source to achieve a target altered spatial power distribution on the workpiece, the target altered spatial power distribution resulting at least in part from interaction between the output beam and the optical distortion pattern within the thermo-optic element.

18. The laser system of claim 16, wherein the thermo-optic element comprises fused silica.

19. The laser system of claim 16, wherein the workpiece comprises an end face of an optical fiber.

20. The laser system of claim 16, wherein the workpiece comprises a metallic object.

21. The laser system of claim 16, wherein the heat source comprises a plurality of individually controllable heating elements each configured to heat a different portion of the thermo-optic element.

22. The laser system of claim 16, further comprising a mirror for directing radiation from the heat source to the thermo-optic element.

23. The laser system of claim 22, wherein the mirror comprises a dichroic mirror.

* * * * *